US012651578B2

(12) United States Patent
Jang et al.

(10) Patent No.: US 12,651,578 B2
(45) Date of Patent: Jun. 9, 2026

(54) DISPLAY DEVICE

(71) Applicant: Samsung Display Co., LTD., Yongin-si (KR)

(72) Inventors: Jae Yong Jang, Yongin-si (KR); Tae Gyun Kim, Yongin-si (KR); Min Jae Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/811,597

(22) Filed: Aug. 21, 2024

(65) Prior Publication Data

US 2025/0218401 A1 Jul. 3, 2025

(30) Foreign Application Priority Data

Dec. 27, 2023 (KR) ........................ 10-2023-0192809

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2300/0426* (2013.01); *G09G 2310/0275* (2013.01); *G09G 2310/08* (2013.01); *G09G 2320/0233* (2013.01); *G09G 2320/0247* (2013.01); *G09G 2330/023* (2013.01)

(58) Field of Classification Search
CPC ....... G09G 3/32; G09G 3/3291; G09G 3/3233
See application file for complete search history.

(56) References Cited

U.S. PATENT DOCUMENTS

| | | | | |
|---|---|---|---|---|
| 2019/0221165 A1* | 7/2019 | Park | G09G 3/3258 | |
| 2022/0069044 A1 | 3/2022 | Kwak et al. | | |
| 2023/0116559 A1* | 4/2023 | Park | G09G 3/3266 | 345/204 |

FOREIGN PATENT DOCUMENTS

| | | |
|---|---|---|
| KR | 10-2281222 B1 | 7/2021 |
| KR | 2021-0092870 A | 7/2021 |
| KR | 2021-0143970 A | 11/2021 |
| KR | 2022-0052747 A | 4/2022 |
| KR | 10-2563660 B1 | 8/2023 |

* cited by examiner

*Primary Examiner* — Sardis F Azongha
(74) *Attorney, Agent, or Firm* — Womble Bond Dickinson (US) LLP

(57) ABSTRACT

The present disclosure relates to a display device capable of improving image quality while reducing power consumption. According to one or more embodiments of the disclosure, a display device includes a light-emitting element connected between a driving voltage line and a common voltage line, a first transistor connected between the driving voltage line and the light-emitting element, a second transistor connected between a data line and a source electrode of the first transistor, a third transistor connected between a gate electrode of the first transistor and a drain electrode of the first transistor, and a fourth transistor connected between a drain electrode of the first transistor and a first initialization voltage line, wherein the third transistor and the fourth transistor include a same type.

26 Claims, 18 Drawing Sheets

DISPLAY DEVICE

CROSS-REFERENCE TO RELATED APPLICATION

The present application claims priority to, and the benefit of, Korean Patent Application No. 10-2023-0192809, filed on Dec. 27, 2023, in the Korean Intellectual Property Office, the entire disclosure of which is incorporated herein by reference.

BACKGROUND

1. Field

The present disclosure relates to a display device capable of improving image quality while reducing power consumption.

2. Description of the Related Art

Generally, a display device includes a source device and a sink device. In this case, the source device (e.g., a graphic processing unit (GPU)) may transmit image data to the sink device, and the sink device performs a display operation based on the image data transmitted from the source device.

Recently, the display device has allowed the frame rate (or driving time) of an image frame constituting the image data to vary in real time while the display operation is being performed, depending on the characteristics of the image displayed by the display operation. In this case, if the frame rate (or driving time) of a panel-driving frame for the display operation is not varied, the frame rate (e.g., GPU rendering speed) of the image frame and the frame rate of the panel-driving frame do not match, causing problems, such as tearing (e.g., image being broken) and stuttering (e.g., image being delayed) in the image displayed by the sink device. Accordingly, a synchronization technique has been proposed to vary the frame rate of the panel-driving frame by increasing or decreasing a vertical blank section in the panel-driving frame as the frame rate of the image frame is varied. However, because the driving time of the panel-driving frame increases as the frame rate of the panel-driving frame decreases, the characteristics of a driving transistor in a pixel circuit included in a display panel may be fixed in a state (e.g., predetermined state) during the panel-driving frame, so that flicker may occur on the display panel due to hysteresis characteristics.

SUMMARY

Aspects of the present disclosure provide a display device capable of improving image quality while reducing power consumption.

According to one or more embodiments of the disclosure, a display device including a light-emitting element connected between a driving voltage line and a common voltage line, a first transistor connected between the driving voltage line and the light-emitting element, a second transistor connected between a data line and a source electrode of the first transistor, a third transistor connected between a gate electrode of the first transistor and a drain electrode of the first transistor, and a fourth transistor connected between a drain electrode of the first transistor and a first initialization voltage line, wherein the third transistor and the fourth transistor include a same type.

The third transistor and the fourth transistor may include an n-type transistor.

The display device may further include a seventh transistor connected between a first electrode of the light-emitting element and a second initialization voltage line.

The display device may further include a third gate line connected to a gate electrode of the seventh transistor and to a gate electrode of the fourth transistor.

The third transistor, the fourth transistor, and the seventh transistor may include a same type.

The third transistor, the fourth transistor, and the seventh transistor may include an n-type transistor.

The display device may further include a fifth transistor connected between the source electrode of the first transistor and the driving voltage line, a sixth transistor connected between the drain electrode of the first transistor and the first electrode of the light-emitting element, an eighth transistor connected between the source electrode of the first transistor and a bias voltage line, and a capacitor connected between the driving voltage line and the gate electrode of the first transistor.

The display device may further include a first gate line connected to a gate electrode of the second transistor, a second gate line connected to a gate electrode of the third transistor, a third gate line connected to a gate electrode of the fourth transistor and to a gate electrode of the seventh transistor, an emission line connected to a gate electrode of the fifth transistor and to a gate electrode of the sixth transistor, and a fourth gate line connected to a gate electrode of the eighth transistor.

The first gate line may be configured to transmit a first gate signal, wherein the second gate line is configured to transmit a second gate signal, wherein the third gate line is configured to transmit a third gate signal, wherein the fourth gate line is configured to transmit a fourth gate signal, and wherein the emission line is configured to transmit an emission signal.

The first gate signal, the second gate signal, the third gate signal, the fourth gate signal, and the emission signal may have an active level and a non-active level in a display scan segment and a self-scan segment.

The display scan segment may include a first bias period, an initialization period, a compensation period, a second bias period, and an emission period.

During the first bias period of the display scan segment, the second gate signal and the fourth gate signal may be configured to have the active level, and the emission signal, the third gate signal, and the first gate signal may be configured to have the non-active level.

During the initialization period of the display scan segment, the third gate signal and the second gate signal may be configured to have the active level, and the emission signal, the first gate signal, and the fourth gate signal may be configured to have the non-active level.

During the compensation period of the display scan segment, the second gate signal and the first gate signal may be configured to have the active level, and the emission signal, the third gate signal, and the fourth gate signal may be configured to have the non-active level.

The first gate signal may be configured to have the active level during a data writing period of the compensation period.

A data voltage may be configured to be applied to the data line during the data writing period.

During the emission period, the emission signal may be configured to have the active level, and the third gate signal, the second gate signal, the first gate signal, and the fourth gate signal may be configured to have the non-active level.

The self-scan segment may include a first bias period, an initialization period, and a second bias period.

During the first bias period of the self-scan segment, the fourth gate signal may be configured to have the active level, and the emission signal, the third gate signal, the second gate signal, and the first gate signal may be configured to have the non-active level.

During the initialization period of the self-scan segment, the third gate signal may be configured to have the active level, and the emission signal, the second gate signal, the first gate signal, and the fourth gate signal may be configured to have the non-active level.

During the second bias period of the self-scan segment, the fourth gate signal may be configured to have the active level, and the emission signal, the third gate signal, the second gate signal, and the first gate signal may be configured to have the non-active level.

The first transistor, the second transistor, the fifth transistor, the sixth transistor, and the eighth transistor may include a p-type transistor, wherein the third transistor, the fourth transistor, and the seventh transistor include an n-type transistor.

According to one or more embodiments of the disclosure, a display device including a light-emitting element connected between a driving voltage line and a common voltage line, a first transistor connected between the driving voltage line and the light-emitting element, a second transistor connected between a data line and a source electrode of the first transistor, a third transistor connected between a gate electrode of the first transistor and a drain electrode of the first transistor, a fourth transistor connected between a drain electrode of the first transistor and a first initialization voltage line, and a seventh transistor connected between a first electrode of the light-emitting element and a second initialization voltage line, wherein the third transistor and the seventh transistor include a same type.

The third transistor and the seventh transistor may include an n-type transistor.

The third transistor, the fourth transistor, and the seventh transistor may include a same type.

The third transistor, the fourth transistor, and the seventh transistor may include an n-type transistor.

In the display device according to one or more embodiments, leakage current may be reduced or minimized, and the occurrence of spots may be reduced or prevented, thereby improving the image quality of the display device.

In addition, the magnitude of a gate signal applied to the gate electrode of a transistor may be reduced, resulting in a reduction in the power consumption of the display device.

The aspects of the present disclosure are not limited to the above-described aspects and other aspects that are not described herein will become apparent to those skilled in the art from the following description.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
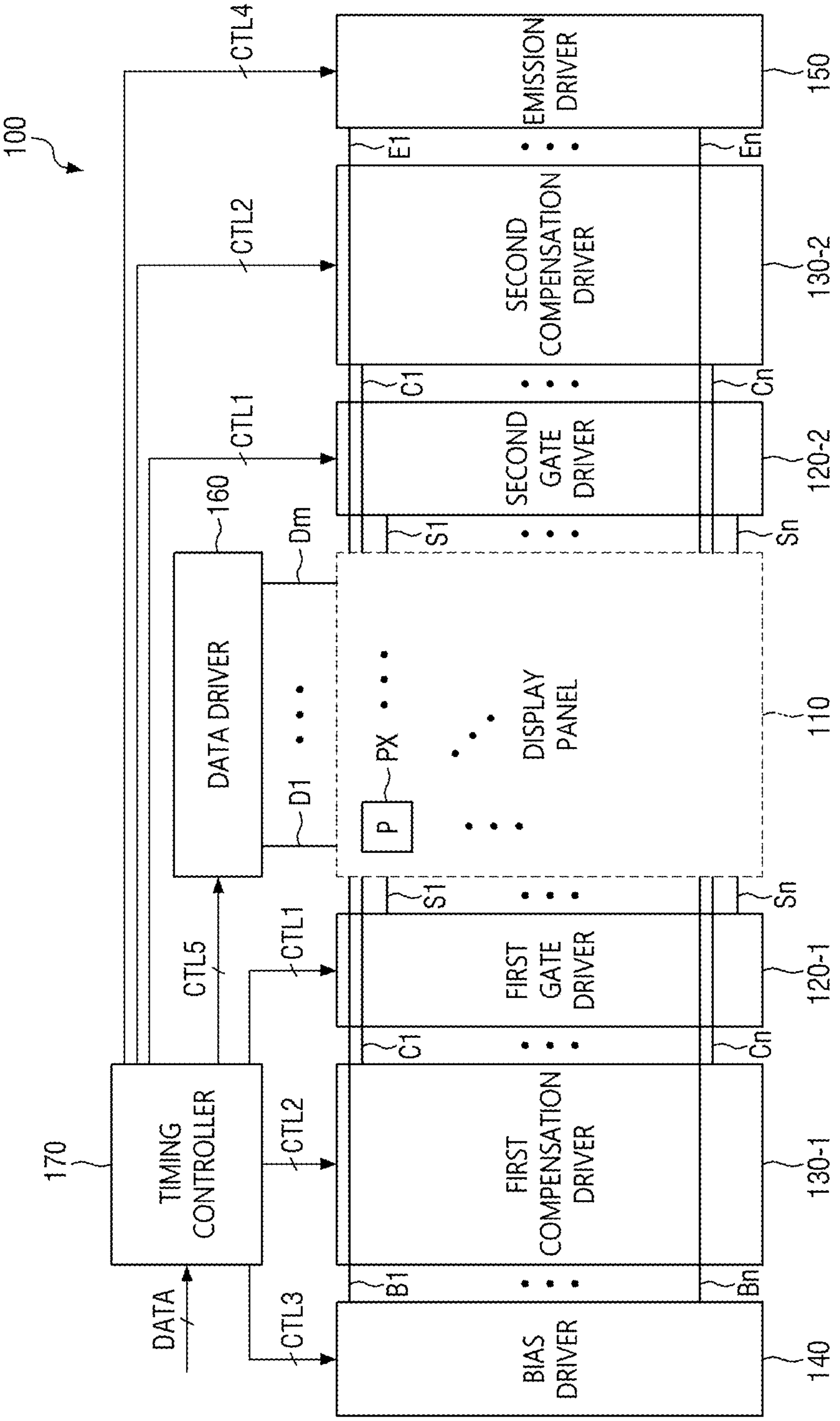
FIG. 1 is a block diagram of a display device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
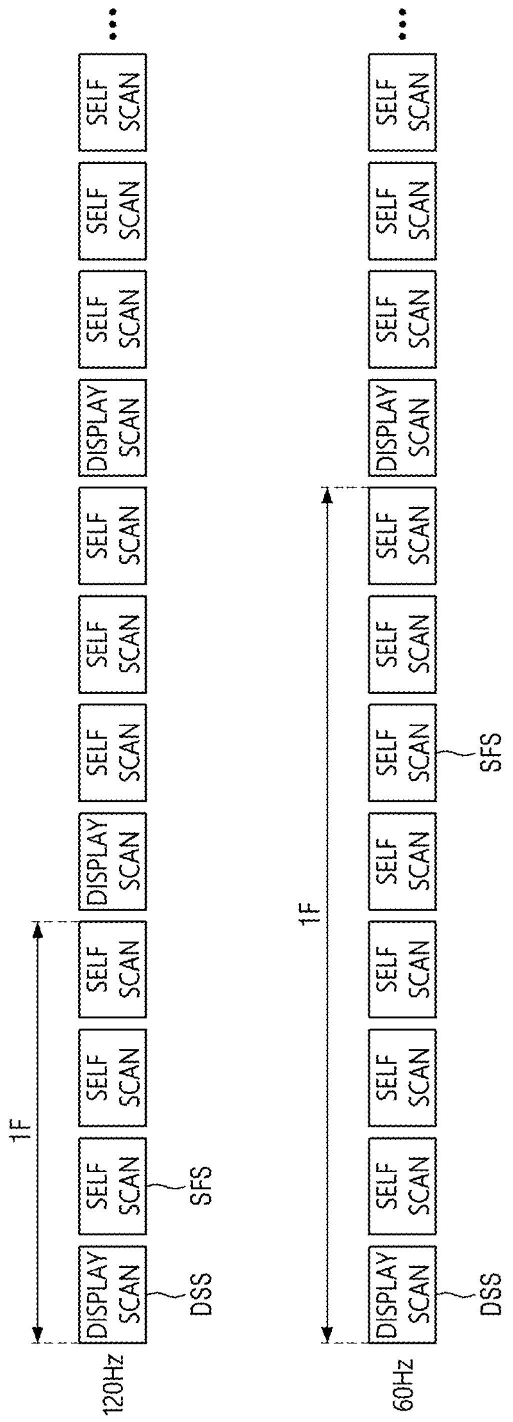
FIG. 2 is a conceptual diagram illustrating the driving operation of the display device of FIG. 1.

FIG. 1 is a block diagram of a display device according to one or more embodiments. FIG. 2 is a conceptual diagram illustrating the driving operation of the display device of FIG. 1.

Referring to FIG. 1, a display device 100 may include a display panel 110, a first gate driver 120-1, a second gate driver 120-2, a first compensation driver 130-1, a second compensation driver 130-2, a bias driver 140, an emission driver 150, a data driver 160, and a timing controller 170. In this case, the display device 100 may display images at various driving frequencies depending on driving conditions. For example, the display device 100 may display images at various driving frequencies from about 1 Hz to about 120 Hz (e.g., the frame rate of a panel-driving frame ranging from about 1 Hz to about 120 Hz). Meanwhile, the display device 100 may be an organic light-emitting display device or a quantum dot light-emitting display device, but is not limited thereto.

The display panel 110 may include a plurality of pixels PX. For example, the pixels PX may include a red pixel, a green pixel, and a blue pixel. Each of the pixels PX may be connected to a gate line Sj (where j is an integer greater than or equal to 1 and less than or equal to n) for transmitting a gate signal, a compensation line Cj for transmitting a compensation signal, a bias line Bj for transmitting a bias signal, and an emission line Ej for transmitting an emission signal.

As shown in the example illustrated in FIG. 2, each of the pixels PX may perform one display scan operation (e.g., an operation of receiving a data voltage to allow a light-emitting element to emit light (or light up)), and at least one self-scan operation (e.g., an operation of changing the characteristics of a driving transistor, such as a first transistor T1 to be described later). According to one or more embodiments, each of the pixels PX may have a so-called 8T-1C structure including eight transistors and one capacitor, but is not limited thereto.

As shown in FIG. 1, the first and second gate drivers 120-1 and 120-2 may be located on respective sides of the display panel 110. The first and second compensation drivers 130-1 and 130-2 may also be respectively located on both sides of the display panel 110. The bias driver 140 may be located on one side of the display panel 110 (e.g., the left side of the display panel 110 in FIG. 1). The emission driver 150 may be located on one side of the display panel 110 (e.g., the right side of the display panel 110 in FIG. 1).

The first and second gate drivers 120-1 and 120-2 may be connected to the display panel 110 through the gate lines S1 to Sn extending in a first direction. The first and second gate drivers 120-1 and 120-2 may apply gate signals to the display panel 110 through the gate lines S1 to Sn extending in the first direction. Because the first and second gate drivers 120-1 and 120-2 are located on both sides of the display panel 110 in the first direction, and apply the gate signals from both sides of the display panel 110, deviations in the fall time and/or rise time of the gate signals depending on the position of the pixels PX in the display panel 110 may not occur. As such, by including the first and second gate drivers 120-1 and 120-2 located on the sides of the display panel 110 in the first direction, the display device 100 may reduce or prevent a phenomenon of luminance unevenness caused by deviations in the fall time and/or rise time of the gate signals depending on the position of the pixels PX in the display panel 110.

The first and second compensation drivers 130-1 and 130-2 may be connected to the display panel 110 through the compensation lines C1 to Cn extending in the first direction. The first and second compensation drivers 130-1 and 130-2 may apply compensation signals to the display panel 110 through the compensation lines C1 to Cn extending in the first direction. In this case, because the first and second compensation drivers 130-1 and 130-2 are located on the sides of the display panel 110 in the first direction, and apply the compensation signals from both sides of the display panel 110, deviations in the fall time and/or rise time of the compensation signals depending on the position of the pixels PX in the display panel 110 may not occur. As such, by including the first and second compensation drivers 130-1 and 130-2 located on both sides of the display panel 110 in the first direction, the display device 100 may reduce or prevent a phenomenon of luminance unevenness caused by deviations in the fall time and/or rise time of the compensation signals depending on the position of the pixels PX in the display panel 110.

The bias driver 140 may be connected to the display panel 110 through the bias lines B1 to Bn extending in the first direction. The bias driver 140 may apply a bias signal to the display panel 110 through the bias lines B1 to Bn extending in the first direction. In this case, the bias driver 140 may be located on one side of the display panel 110 in the first direction (e.g., the left side of the display panel 110 in FIG. 1).

The emission driver 150 may be connected to the display panel 110 through the emission lines E1 to En extending in the first direction. The emission driver 150 may apply an emission signal to the display panel 110 through the emission lines E1 to En extending in the first direction. In this case, the emission driver 150 may be located on one side of the display panel 110 in the first direction (e.g., the right side of the display panel 110 in FIG. 1). In general, the fall time and/or rise time of the gate signal applied to the pixel PX and the fall time and/or rise time of the compensation signal applied to the pixel PX have a relatively large effect on the luminance of the pixel PX. The fall time and/or rise time of the bias signal applied to the pixel PX and the fall time and/or rise time of the emission signal applied to the pixel PX have a relatively small effect on the luminance of the pixel PX. Accordingly, the bias driver 140 and the emission driver 150 may be located on only one respective side of the display panel 110.

The display panel 110 may be connected to the data driver 160 through data lines D1 to Dm extending in a second direction crossing the first direction. The data driver 160 may provide a data voltage (or data signal) to the display panel 110 through the data lines D1 to Dm extending in the second direction crossing the first direction. For example, as shown in FIG. 2, the data driver 160 may apply a data voltage (or data signal) to the display panel 110 in a display scan segment DSS in which the pixels PX perform a display scan operation, and may not apply a data voltage (or data signal) to the display panel 110 in a self-scan segment SFS in which the pixels PX perform a self-scan operation.

The timing controller 170 may generate a plurality of control signals CTL1, CTL2, CTL3, CTL4, and CTL5 to control the first gate driver 120-1, the second gate driver 120-2, the first compensation driver 130-1, the second compensation driver 130-2, the bias driver 140, the emission driver 150, and the data driver 160. The timing controller 170 may receive image data DATA from an external component (e.g., a graphic processing unit (GPU) and the like) through an interface (e.g., predetermined interface), and may perform processing (e.g., predetermined processing, such as luminance compensation, degradation compensation, and the like) on the image data DATA to provide it to the data driver 160. For example, as shown in FIG. 2, the timing controller 170 may perform one display scan segment DSS and at least one self-scan segment SFS at a driving frequency (e.g., about 120 Hz or about 60 Hz in FIG. 2) of the display panel 110. In one or more embodiments, when the driving frequency of the display panel 110 is about 120 Hz, one panel-driving frame 1F may include one display scan segment DSS and three self-scan segments SFS. When the driving frequency of the display panel 110 is about 60 Hz, one panel-driving frame 1F may include one display scan segment DSS and seven self-scan segments SFS. In this way, the timing controller 170 may respond to variations in the driving frequency (e.g., variations in the frame rate of the panel-driving frame or variations in the driving time of the panel-driving frame) of the display panel 110 by adjusting the number of the self-scan segments SFS.

Figure 3:
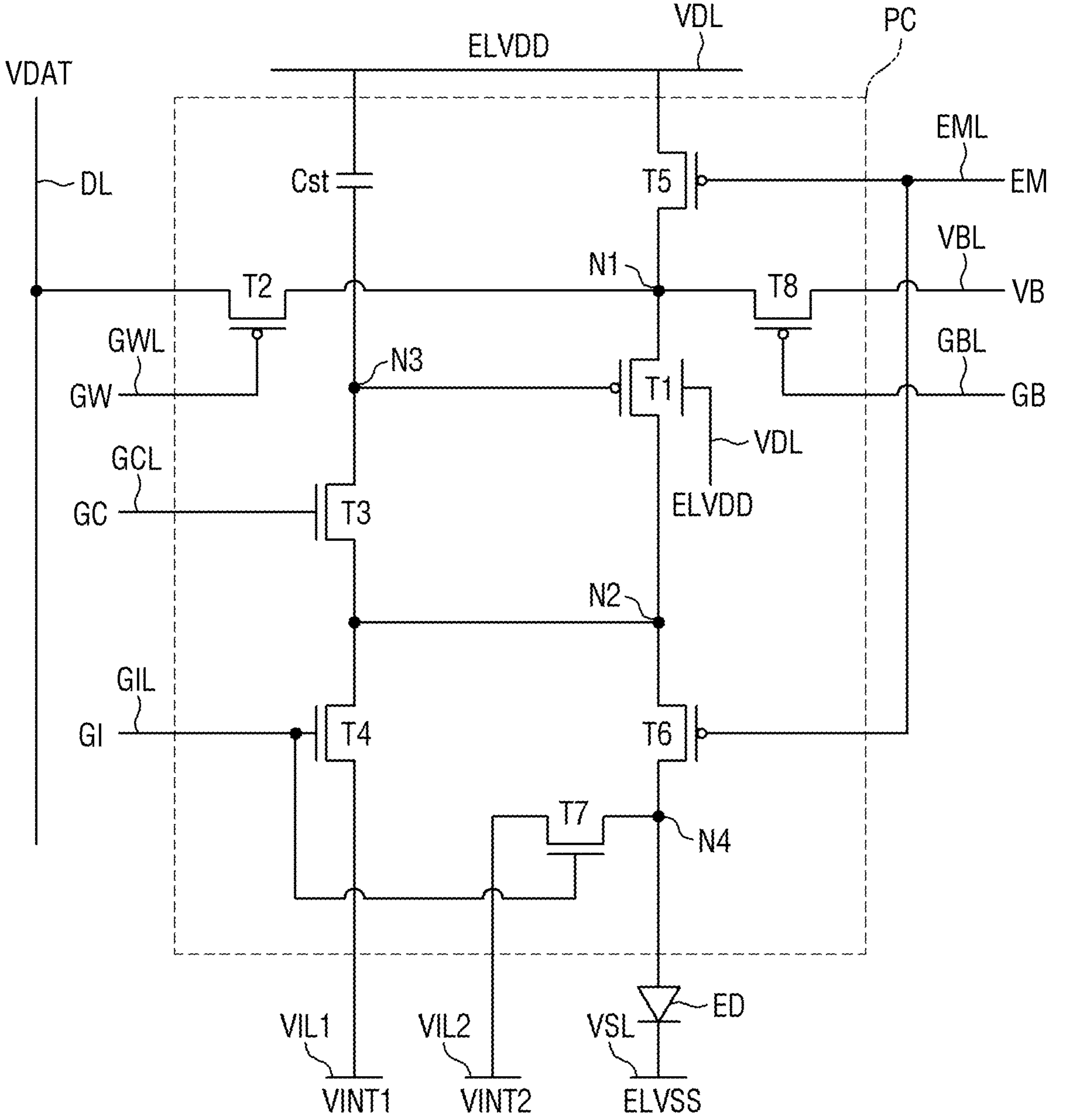
FIG. 3 is an equivalent circuit diagram of the pixel according to one or more embodiments.

FIG. 3 is an equivalent circuit diagram of the pixel PX according to one or more embodiments.

The pixel SP may be connected to a first gate line GWL, a second gate line GCL, a third gate line GIL, a fourth gate line GBL, an emission line EML, a data line DL, a driving voltage line VDL, a common voltage line VSL, a first initialization voltage line VIL1, a second initialization voltage line VIL2, and a bias voltage line VBL.

The pixel PX may include a pixel circuit PC and a light-emitting element ED. The pixel circuit PC may include the first transistor T1 (e.g., the driving transistor), a second transistor T2 (e.g., a switching transistor), a third transistor T3 (e.g., a compensation transistor), a fourth transistor T4 (e.g., an initialization transistor), a fifth transistor T5 (e.g., a first light-emitting transistor), a sixth transistor T6 (e.g., a second light-emitting transistor), a seventh transistor T7 (e.g., a reset transistor), an eighth transistor T8 (e.g., a self-scan transistor), and a capacitor Cst (e.g., a storage capacitor).

The first transistor T1 may include a gate electrode, a source electrode, and a drain electrode. The first transistor T1 may control a source-drain current (hereinafter, a driving current) according to the data voltage applied to the gate electrode. The driving current (e.g., Isd) flowing through a channel region of the first transistor T1 may be proportional to the square of a difference between the threshold voltage (e.g., Vth) and the voltage between the source electrode and the gate electrode (e.g., Vsg) of the first transistor T1 ($Isd=k\times(Vsg-Vth)^2$). Here, k is a proportional coefficient determined by the structure and physical characteristics of the first transistor T1, Vsg is a source-gate voltage of the first transistor T1, and Vth is a threshold voltage of the first transistor T1. According to one or more embodiments, the first transistor T1 may further include a counter gate electrode supplied with a driving voltage ELVDD. The counter gate electrode of the first transistor T1 may be located opposite to the gate electrode of the first transistor T1 with an active layer interposed therebetween. The counter gate electrode of the first transistor T1 may be connected to the driving voltage line VDL. The driving voltage ELVDD applied to the counter gate electrode of the first transistor T1 may improve the hysteresis of the first transistor T1.

The light-emitting element ED may emit light by receiving a driving current. The light emission amount or the luminance of the light-emitting element ED may be proportional to the magnitude of the driving current.

The light-emitting element ED may be an organic light-emitting diode including a first electrode (e.g., pixel electrode or anode electrode), a second electrode (e.g., common electrode or cathode electrode), and an organic light-emitting layer located between the first and second electrodes. For another example, the light-emitting element ED may be an inorganic light-emitting element including a first electrode, a second electrode, and an inorganic semiconductor located between the first electrode and the second electrode. For still another example, the light-emitting element ED may be a quantum dot light-emitting element including a first electrode, a second electrode, and a quantum dot light-emitting layer located between the first electrode and the second electrode. For still another example, the light-emitting element ED may be a micro light-emitting diode.

The first electrode of the light-emitting element ED may be electrically connected to the fourth node N4. The first electrode of the light-emitting element ED may be connected to the drain electrode of the sixth transistor T6 and to the source electrode of the seventh transistor T7 through the fourth node N4. The second electrode of the light-emitting element ED may be connected to the common voltage line VSL. The second electrode of the light-emitting element ED may receive a common voltage ELVSS (e.g., low potential voltage) from the common voltage line VSL.

The second transistor T2 may be turned on by a first gate signal GW of the first gate line GWL to electrically connect the data line DL with a first node N1 that is the source electrode of the first transistor T1. The second transistor T2 may be turned on based on the first gate signal GW to supply the data voltage to the first node N1. The gate electrode of the second transistor T2 may be electrically connected to the first gate line GWL, the source electrode thereof may be electrically connected to the data line DL, and the drain electrode thereof may be electrically connected to the first node N1.

The third transistor T3 may be turned on by a second gate signal GC of the second gate line GCL to electrically connect the second node N2, which is the drain electrode of the first transistor T1, to the third node N3, which is the gate electrode of the first transistor T1. The third transistor T3 may be connected in series between the second node N2 and the third node N3. For example, the gate electrode of the third transistor T3 may be electrically connected to the second gate line GCL, the drain electrode thereof may be electrically connected to the third node N3, and the source electrode thereof may be electrically connected to the second node N2. The third transistor T3 may be turned on by a second gate signal GC of the second gate line GCL to electrically connect the second node N2, which is the drain electrode of the first transistor T1, to the third node N3, which is the gate electrode of the first transistor T1.

The fourth transistor T4 may be turned on by a third gate signal GI of the third gate line GIL to electrically connect the second node N2, which is the drain electrode of the first transistor T1, to the first initialization voltage line VIL1. The fourth transistor T4 may be connected in series between the second node N2 and the first initialization voltage line VIL1. For example, the gate electrode of the fourth transistor T4 may be electrically connected to the third gate line GIL, the drain electrode thereof may be electrically connected to the second node N2, and the source electrode thereof may be electrically connected to the first initialization voltage line VIL1. The first initialization voltage line VIL1 may transmit a first initialization voltage VINT1. On the other hand, the fourth transistor T4 and the aforementioned third transistor T3 may be connected in series between the third node N3 and the first initialization voltage line VIL1. Accordingly, leakage current from the third node N3 (e.g., leakage current generated through the turned-off third and fourth transistors T3 and T4) may be reduced or minimized. For example, the third node N3 is a node corresponding to the gate electrode of the first transistor T1 that controls the magnitude of the driving current supplied to the light-emitting element ED, and if a leakage path exists between the third node N3 and the first initialization voltage line VIL1, the voltage of the third node N3 may fluctuate, resulting in degradation of the image quality of the display device 100. According to one or more embodiments, the leakage current of the third node N3 described above may be reduced or minimized by connecting a plurality of transistors (e.g., the third and fourth transistors T3 and T4) in series on the leakage path between the third node N3 and the first initialization voltage line VIL1.

The fifth transistor T5 may be turned on by an emission signal EM of the emission line EML to electrically connect the driving voltage line VDL with the first node N1 that is the source electrode of the first transistor T1. The gate electrode of the fifth transistor T5 may be electrically connected to the emission line EML, the source electrode thereof may be electrically connected to the driving voltage line VDL, and the drain electrode thereof may be electrically connected to the first node N1.

The sixth transistor T6 may be turned on by the emission signal EM of the emission line EML to electrically connect the second node N2 that is the drain electrode of the first transistor T1 with the fourth node N4 that is the first electrode of the light-emitting element ED. The gate electrode of the sixth transistor T6 may be electrically connected to the emission line EML, the source electrode thereof may be electrically connected to the second node N2, and the drain electrode thereof may be electrically connected to the fourth node N4.

The seventh transistor T7 may be turned on by a third gate signal GI of the third gate line GIL to electrically connect the fourth node N4 that is the first electrode of the light-emitting element ED with the second initialization voltage line VIL2. By turning on the seventh transistor T7 based on the third gate signal GI, the first electrode of the light-emitting element ED may be discharged to a second initialization voltage VINT2. The gate electrode of the seventh transistor T7 may be electrically connected to the third gate line GIL, the drain electrode thereof may be electrically connected to the fourth node N4, and the source electrode thereof may be electrically connected to the second initialization voltage line VIL2. The second initialization voltage line VIL2 may transmit the second initialization voltage VINT2. The seventh transistor T7 and the aforementioned fourth transistor T4 may be connected to the same gate line GIL. According to one or more embodiments, the seventh transistor T7 may be an n-type transistor. Accordingly, the magnitude of the third gate signal GI for turning on the seventh transistor T7 may be reduced or minimized. For example, a low voltage (e.g., the second initialization voltage VINT2 of negative polarity) may be applied to the source electrode of the seventh transistor T7 to discharge (or initialize) the fourth node N4, so that an active level of the third gate signal GI may be set to a voltage of positive polarity of relatively small magnitude. Accordingly, when the seventh transistor T7 is an n-type transistor, power consumption may be reduced. For the same reason, the fourth transistor T4, which receives the first initialization voltage VINT1 of negative polarity through the source electrode, may also be an n-type transistor.

The eighth transistor T8 may be turned on by the fourth gate signal GB of the fourth gate line GBL to electrically connect the bias voltage line VBL with the first node N1 that is the source electrode of the first transistor T1. The eighth transistor T8 may be turned on according to the fourth gate signal GB to supply a bias voltage VB to the first node N1. The eighth transistor T8 may improve hysteresis of the first transistor T1 by supplying the bias voltage VB to the source electrode of the first transistor T1. The gate electrode of the eighth transistor T8 may be electrically connected to the fourth gate line GBL, the source electrode thereof may be electrically connected to the bias voltage line VBL, and the drain electrode thereof may be electrically connected to the first node N1.

When all of the above-described fifth transistor T5, first transistor T1, and sixth transistor T6 are turned on, the driving current may be supplied to the light-emitting element ED.

Each of the first transistor T1, the second transistor T2, the fifth transistor T5, the sixth transistor T6, and the eighth transistor T8 may include a silicon-based active layer. For example, each of the first transistor T1, the second transistor T2, the fifth transistor T5, the sixth transistor T6, and the eighth transistor T8 may be a p-type transistor including an active layer made of low temperature polycrystalline silicon (LTPS). The active layer made of low temperature polycrystalline silicon may have relatively high electron mobility and suitable turn-on characteristics. Accordingly, in the display device 100, because the transistors having suitable turn-on characteristics are included, it is possible to stably and relatively efficiently drive the plurality of pixels PX. Each of the first transistor T1, the second transistor T2, the fifth transistor T5, the sixth transistor T6, and the eighth transistor T8 may output a current flowing into the source electrode to the drain electrode based on a gate low voltage applied to the gate electrode.

The third transistor T3, the fourth transistor T4, and the seventh transistor T7 may each be an n-type transistor including an oxide-based active layer. The transistor including the oxide-based active layer may have a coplanar structure in which a gate electrode is located thereon. The transistor including the oxide-based active layer may output a current flowing into the drain electrode to the source electrode based on a gate high voltage applied to the gate electrode.

The capacitor Cst may be electrically connected between the third node N3 that is the gate electrode of the first transistor T1 and the driving voltage line VDL. For example, the first electrode of the capacitor Cst may be electrically connected to the third node N3, and the second electrode of the capacitor Cst may be electrically connected to the driving voltage line VDL, so that a potential difference between the driving voltage line VDL and the gate electrode of the first transistor T1 may be maintained.

The driving voltage ELVDD, the common voltage ELVSS, the first initialization voltage VINT1, the second initialization voltage VINT2, and the bias voltage VB may each be a direct current voltage. Here, the driving voltage ELVDD and the bias voltage VB may each be a direct current voltage of positive polarity, and the common voltage ELVSS, the first initialization voltage VINT1, and the second initialization voltage VINT2 may each be a voltage of negative polarity. Here, the bias voltage VB may be greater than the driving voltage ELVDD. The driving voltage ELVDD may be greater than the common voltage ELVSS. The first initialization voltage VINT1 and the second initialization voltage VINT2 may have the same magnitude. The second initialization voltage VINT2 may be less than or equal to the common voltage ELVSS.

Figure 4:
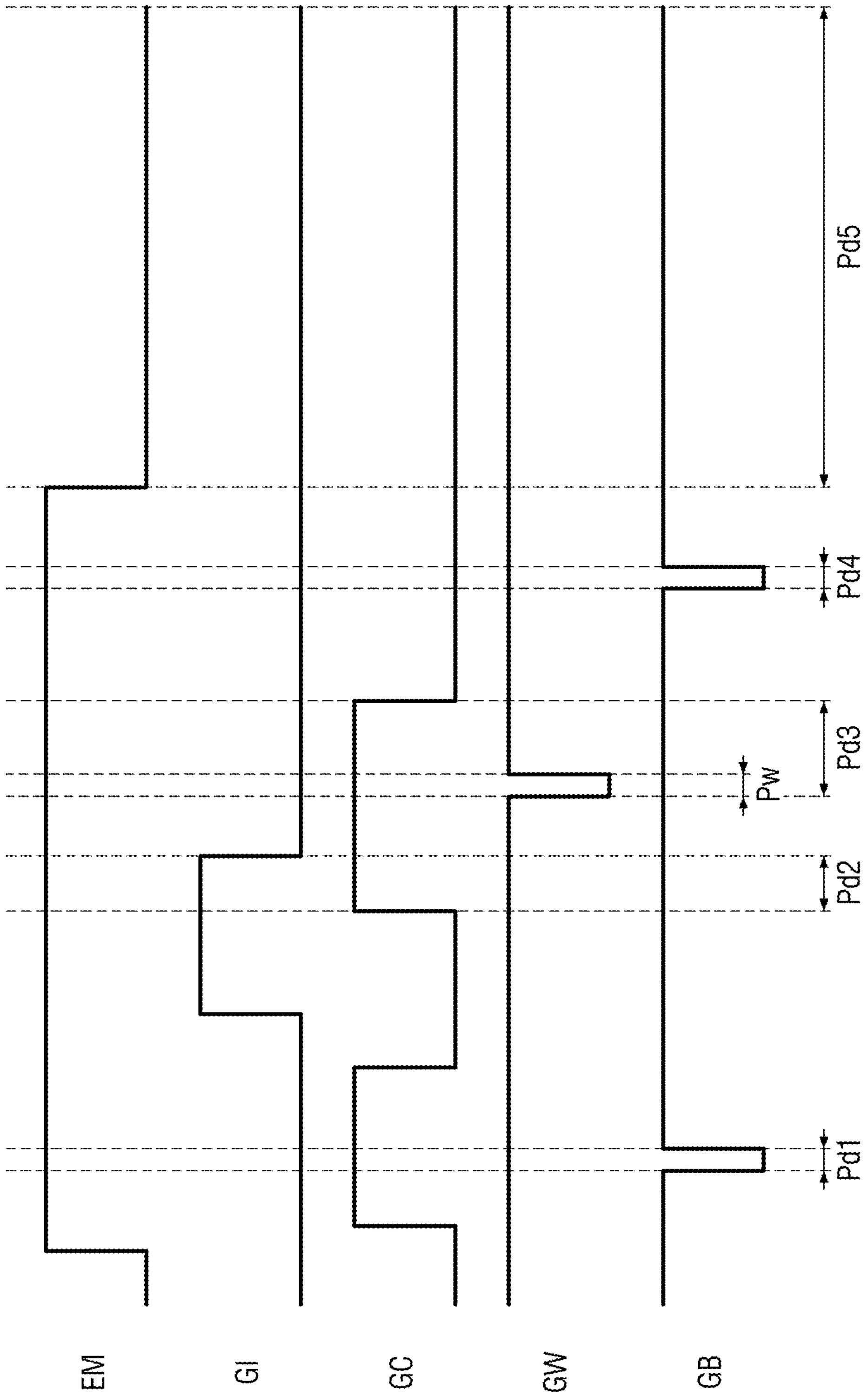
FIG. 4 is a timing diagram of the emission signal, the third gate signal, the second gate signal, the first gate signal, and the fourth gate signal of FIG. 3 in the display scan segment.

FIG. 4 is a timing diagram of the emission signal EM, the third gate signal GI, the second gate signal GC, the first gate signal GW, and the fourth gate signal GB of FIG. 3 in the display scan segment DSS.

Referring to FIG. 4, the display scan segment DSS may include multiple periods including a first bias period Pd1, an initialization period Pd2, a compensation period Pd3, a second bias period Pd4, and an emission period Pd5.

The emission signal EM, the third gate signal GI, the second gate signal GC, the first gate signal GW, and the fourth gate signal GB may each have an active level or a non-active level for each period of the display scan segment DSS. Here, the active level of each signal described above may mean a voltage at a level capable of turning on a corresponding transistor to which the corresponding signal is applied. In other words, the active level signal may have a value greater than the threshold voltage of the corresponding transistor. For example, when the corresponding transistor is a p-type transistor, the active level of the signal applied to the gate electrode of the corresponding transistor may mean a low level (e.g., negative polarity level or low voltage level).

Meanwhile, the non-active level of each signal may mean a voltage at a level capable of turning off a corresponding transistor. In other words, the non-active level signal may have a smaller value than the threshold voltage of the corresponding transistor. For example, when the corresponding transistor is a p-type transistor, the non-active level of the signal applied to the gate electrode of the corresponding transistor may mean a high level (e.g., positive polarity level or high voltage level).

In contrast, when the corresponding transistor is an n-type transistor, the active level of the signal applied to the gate electrode of the corresponding transistor may mean a high level (e.g., positive polarity level or high voltage level), and the non-active level of the signal applied to the gate electrode of the corresponding transistor may mean a low level (e.g., negative polarity level or low voltage level).

During the first bias period Pd1, the second gate signal GC and the fourth gate signal GB may each have the active level. Meanwhile, during the first bias period Pd1, the emission signal EM, the third gate signal GI, and the first gate signal GW may each have the non-active level.

During the initialization period Pd2, the third gate signal GI and the second gate signal GC may each have the active level. Meanwhile, during the initialization period Pd2, the emission signal EM, the first gate signal GW, and the fourth gate signal GB may each have the non-active level.

In the compensation period Pd3, the second gate signal GC and the first gate signal GW may each have the active level. Meanwhile, during the compensation period Pd3, the emission signal EM, the third gate signal GI, and the fourth gate signal GB may each have the non-active level. Here, in the compensation period Pd3, the first gate signal GW may have the active level during a partial period (e.g., a data writing period Pw) of the compensation period Pd3. For example, in the compensation period Pd3, the first gate signal GW may have the active level for a partial period (e.g., the data writing period Pw) from the starting point of the compensation period Pd3, and may have the non-active level for the remaining period of the compensation period Pd3 excluding the partial period (e.g., excluding the data writing period Pw). In the data writing period Pw, a data voltage VDAT may be applied to the data line DL. Here, in the compensation period Pd3, the time for which the first gate signal GW is maintained at the active level may be shorter than the time for which the first gate signal GW is maintained at the non-active level.

During the second bias period Pd4, the fourth gate signal GB may have the active level. Meanwhile, during the second bias period Pd4, the emission signal EM, the third gate signal GI, the second gate signal GC, and the first gate signal GW may each have the non-active level.

During the emission period Pd5, the emission signal EM may have the active level. Meanwhile, during the emission period Pd5, the third gate signal GI, the second gate signal GC, the first gate signal GW, and the fourth gate signal GB may each have the non-active level.

With reference to FIGS. 5 to 9, the operation of the display device 100 in the display scan segment DSS according to one or more embodiments will be described as follows. In FIGS. 5 to 9, transistors surrounded by dotted circles are in a turn-on state, and transistors other than those surrounded by the dotted circles are in a turn-off state.

First, with reference to FIGS. 4 and 5, the operation of the display device 100 during the first bias period Pd1 of the display scan segment DSS will be described as follows.

Figure 5:
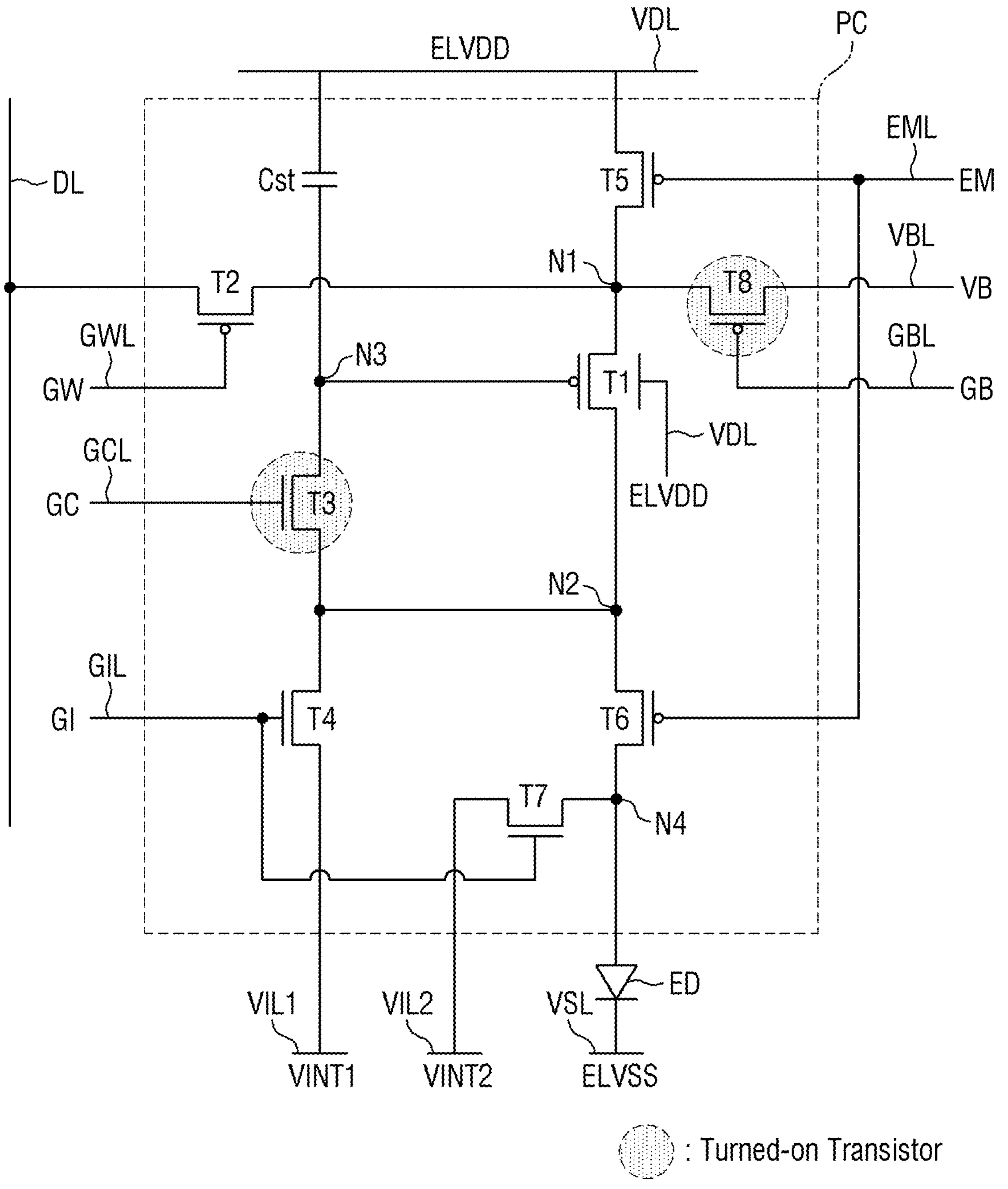
FIG. 5 is a diagram illustrating the operation of the display device of FIG. 3 during the first bias period of the display scan segment of FIG. 4.

FIG. 5 is a diagram illustrating the operation of the display device 100 of FIG. 3 during the first bias period Pd1 of the display scan segment DSS of FIG. 4.

As shown in FIG. 4, during the first bias period Pd1, the second gate signal GC and the fourth gate signal GB may each have the active level. Meanwhile, during the first bias period Pd1, the emission signal EM, the third gate signal GI, and the first gate signal GW may each have the non-active level.

The active level second gate signal GC may be applied to the gate electrode of the third transistor T3 through the second gate line GCL. Accordingly, the third transistor T3 may be turned on.

The active level fourth gate signal GB may be applied to the gate electrode of the eighth transistor T8 through the fourth gate line GBL. Accordingly, the eighth transistor T8 may be turned on.

The non-active level emission signal EM may be applied to each of the gate electrode of the fifth transistor T5 and the gate electrode of the sixth transistor T6 through the emission line EML. Accordingly, the fifth transistor T5 and the sixth transistor T6 may each be turned off.

The non-active level third gate signal GI may be applied to each of the gate electrode of the fourth transistor T4 and the gate electrode of the seventh transistor T7 through the third gate line GIL. Accordingly, the fourth transistor T4 and the seventh transistor T7 may each be turned off.

The non-active level first gate signal GW may be applied to the gate electrode of the second transistor T2 through the first gate line GWL. Accordingly, the second transistor T2 may be turned off.

As the third transistor T3 is turned on, the gate electrode and the drain electrode of the first transistor T1 may be connected. In addition, the second node N2 may be connected to the capacitor Cst through the turned-on third transistor T3. Accordingly, the voltage of the third node N3 and the voltage of the second node N2 may be initialized (e.g., pre-initialized) by the charge stored in the capacitor Cst. In other words, the voltage of the gate electrode and the voltage of the drain electrode of the first transistor T1 may each be preliminarily initialized (e.g., pre-initialized) by the charge in the capacitor Cst.

As the eighth transistor T8 is turned on, the bias voltage VB may be applied to the source electrode (e.g., the first node N1) of the first transistor T1 through the turned-on eighth transistor T8. Accordingly, the hysteresis change of the first transistor T1 may be reduced or minimized in the first bias period Pd1. Therefore, the flickering phenomenon of the display device 100 may be reduced or prevented, especially when the display device 100 is driven at a low driving frequency. Further, the voltage of the first node N1 may be initialized to the bias voltage VB. In other words, the voltage of the source electrode of the first transistor T1 may be initialized to the bias voltage VB.

Next, with reference to FIGS. 4 and 6, the operation of the display device 100 during the initialization period Pd2 of the display scan segment DSS will be described as follows.

Figure 6:
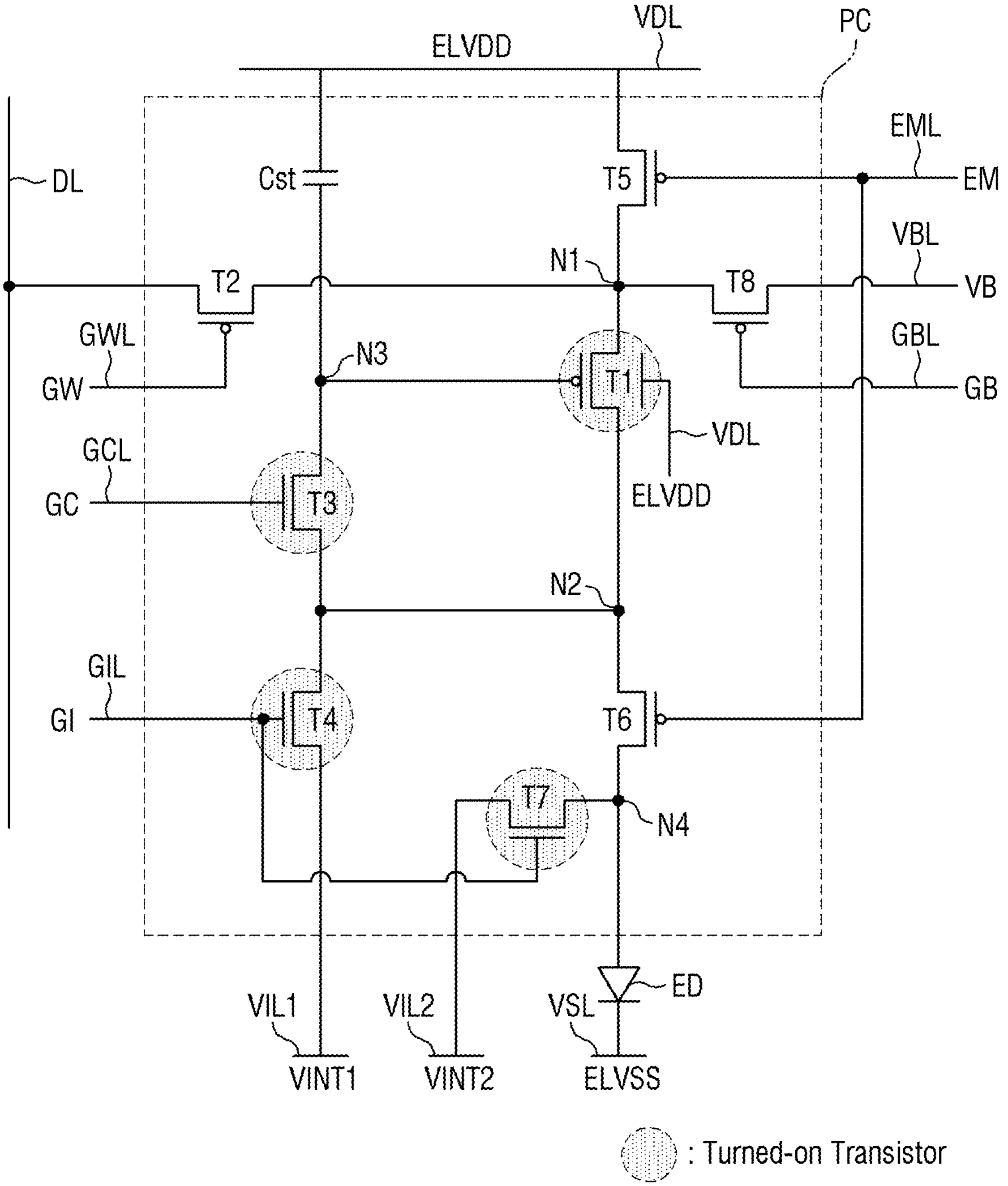
FIG. 6 is a diagram illustrating the operation of the display device of FIG. 3 during the initialization period of the display scan segment of FIG. 4.

FIG. 6 is a diagram illustrating the operation of the display device 100 of FIG. 3 during the initialization period Pd2 of the display scan segment DSS of FIG. 4.

As shown in FIG. 4, during the initialization period Pd2, the third gate signal GI and the second gate signal GC may each have the active level. Meanwhile, during the initialization period Pd2, the emission signal EM, the first gate signal GW, and the fourth gate signal GB may each have the non-active level.

The active level third gate signal GI may be applied to each of the gate electrode of the fourth transistor T4 and the gate electrode of the seventh transistor T7 through the third gate line GIL. Accordingly, the fourth transistor T4 and the seventh transistor T7 may each be turned on.

The active level second gate signal GC may be applied to the gate electrode of the third transistor T3 through the second gate line GCL. Accordingly, the third transistor T3 may be turned on.

The non-active level emission signal EM may be applied to each of the gate electrode of the fifth transistor T5 and the gate electrode of the sixth transistor T6 through the emission line EML. Accordingly, the fifth transistor T5 and the sixth transistor T6 may each be turned off.

The non-active level first gate signal GW may be applied to the gate electrode of the second transistor T2 through the first gate line GWL. Accordingly, the second transistor T2 may be turned off.

The non-active level fourth gate signal GB may be applied to the gate electrode of the eighth transistor T8 through the fourth gate line GBL. Accordingly, the eighth transistor T8 may be turned off.

As the third transistor T3 and the fourth transistor T4 are turned on, the voltages of the third node N3 and the second node N2 may be initialized to the first initialization voltage VINT1. In other words, the gate electrode and the drain electrode of the first transistor T1 may each be initialized to the first initialization voltage VINT1. Because the third node N3 and the second node N2 have been preliminarily initialized to a certain voltage in a previous period (e.g., the first bias period Pd1), each of the voltages of the third node N3 and the second node N2 may rapidly transition to the substantial initialization voltage (e.g., the first initialization voltage VINT1) in the initialization period Pd2.

The first initialization voltage VINT1 applied to the third node N3 (e.g., the first initialization voltage VINT1 applied to the gate electrode of the first transistor T1) may be set to a value that is less than the sum of the bias voltage VB of the first node N1 (e.g., the bias voltage VB applied to the source electrode of the first transistor T1) and the threshold voltage of the first transistor T1, so that the p-type first transistor T1 may be turned on in the initialization period Pd2.

Meanwhile, as the seventh transistor T7 is turned on, the second initialization voltage VINT2 from the second initialization voltage line VIL2 may be applied to the fourth node N4 through the turned-on seventh transistor T7. In other words, the second initialization voltage VINT2 from the second initialization voltage line VIL2 may be applied to the first electrode of the light-emitting element ED. Accordingly, the voltage of the first electrode of the light-emitting element ED may be initialized to the second initialization voltage VINT2. For example, the second initialization voltage VINT2 may have a value that is less than the sum of the threshold voltage of the light-emitting element ED and the common voltage ELVSS. Accordingly, the light-emitting element ED may be maintained in a reverse bias state during the initialization period Pd2. Accordingly, the light-emitting element ED may be maintained in an unlit state during the initialization period Pd2.

Next, with reference to FIGS. 4 and 7, the operation of the display device 100 during the compensation period Pd3 of the display scan segment DSS will be described as follows.

Figure 7:
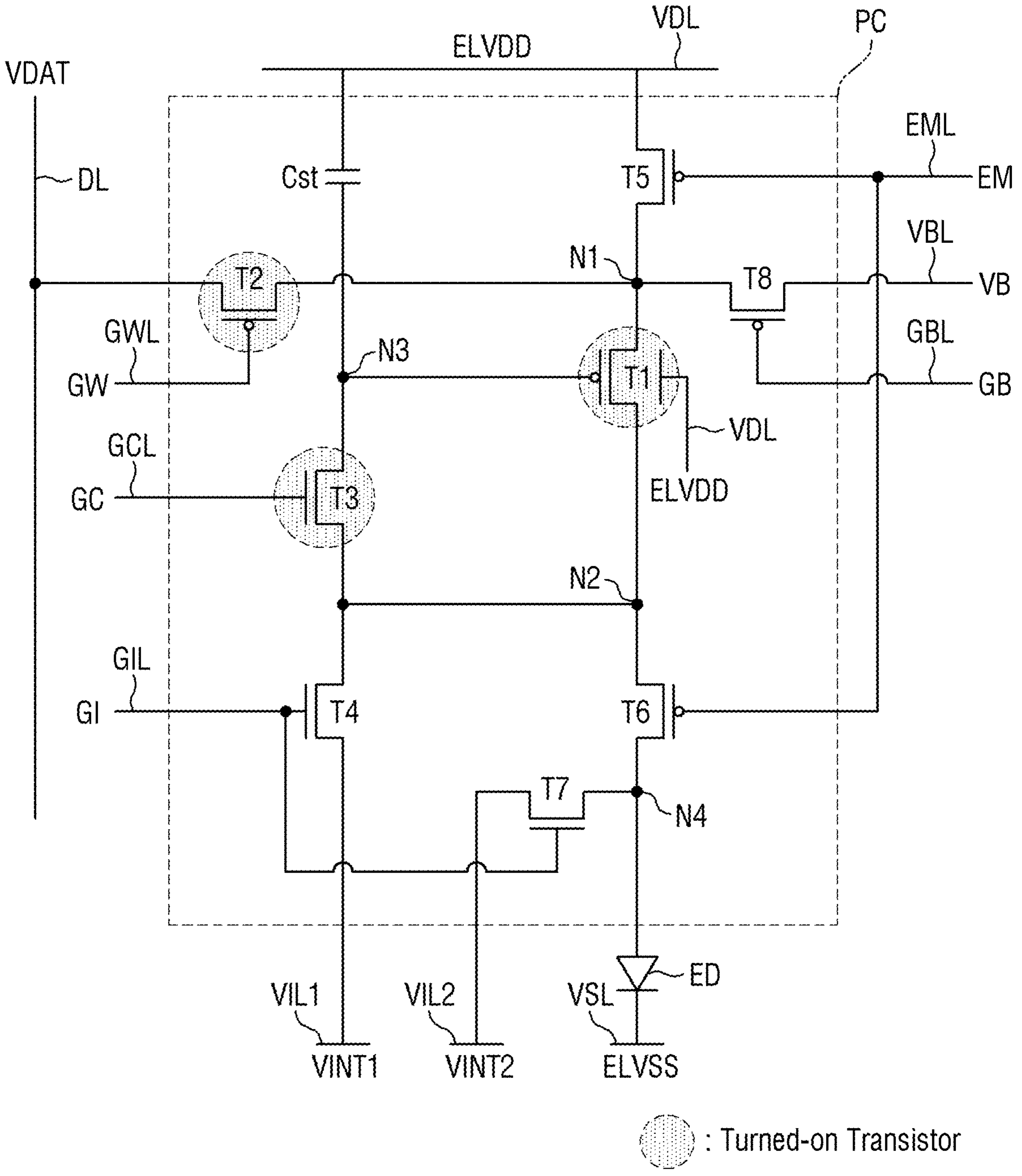
FIG. 7 is a diagram illustrating the operation of the display device of FIG. 3 during the compensation period of the display scan segment of FIG. 4.

FIG. 7 is a diagram illustrating the operation of the display device 100 of FIG. 3 during the compensation period Pd3 of the display scan segment DSS of FIG. 4.

As shown in FIG. 4, in the compensation period Pd3, the second gate signal GC and the first gate signal GW may each have the active level. Here, in the compensation period Pd3, the first gate signal GW may have the active level during a partial period (e.g., the data writing period Pw) of the compensation period Pd3. Meanwhile, during the compensation period Pd3, the emission signal EM, the third gate signal GI, and the fourth gate signal GB may each have the non-active level.

The active level second gate signal GC may be applied to the gate electrode of the third transistor T3 through the second gate line GCL. Accordingly, the third transistor T3 may be turned on.

The active level first gate signal GW may be applied to the gate electrode of the second transistor T2 through the first gate line GWL. Accordingly, the second transistor T2 may be turned on. Meanwhile, the first gate signal GW may be turned on for a partial period (e.g., the data writing period Pw) of the compensation period Pd3 and then turned off for the remaining period of the compensation period Pd3 excluding the data writing period Pw.

The non-active level emission signal EM may be applied to each of the gate electrode of the fifth transistor T5 and the gate electrode of the sixth transistor T6 through the emission line EML. Accordingly, the fifth transistor T5 and the sixth transistor T6 may each be turned off.

The non-active level third gate signal GI may be applied to each of the gate electrode of the fourth transistor T4 and the gate electrode of the seventh transistor T7 through the third gate line GIL. Accordingly, the fourth transistor T4 and the seventh transistor T7 may each be turned off.

The non-active level fourth gate signal GB may be applied to the gate electrode of the eighth transistor T8 through the fourth gate line GBL. Accordingly, the eighth transistor T8 may be turned off.

As the second transistor T2 is turned on, the data voltage VDAT from the data line DL may be applied to the first node N1 through the turned-on second transistor T2. In other words, the data voltage VDAT from the data line DL may be applied to the source electrode of the first transistor T1. Here, the data voltage VDAT may be a voltage having a corresponding gray level (or luminance) for displaying an image. The first initialization voltage VINT1 applied to the third node N3 (e.g., the first initialization voltage VINT1 applied to the gate electrode of the first transistor T1) may be set to a value that is less than the sum of the data voltage VDAT of the first node N1 (e.g., the data voltage VDAT applied to the source electrode of the first transistor T1) and the threshold voltage of the first transistor T1, so that the p-type first transistor T1 may be turned on in the compensation period Pd3.

Meanwhile, as the third transistor T3 is turned on, the third node N3 and the second node N2 may be connected to each other. In other words, as the gate electrode and the drain electrode of the first transistor T1 are electrically connected to each other, the turned-on first transistor T1 may operate as a diode. In this case, current flows from the first node N1 to the second node N2 through the turned-on first transistor T1, and accordingly, the voltage of the second node N2 and the voltage of the third node N3 connected to the second node N2 begin to increase. In other words, the voltage of the drain electrode and the voltage of the gate electrode of the first transistor T1 begin to increase. As the voltage of the gate electrode of the first transistor T1 increases, the first transistor T1 may be turned off at the moment when the gate-source voltage of the first transistor T1 (e.g., the differential voltage (e.g., Vgs) between the voltage of the gate electrode of the first transistor T1 and the voltage of the source electrode of the first transistor T1) becomes equal to the threshold voltage of the first transistor T1. When the first transistor T1 is turned off, the threshold voltage of the first transistor T1 may be maintained by the capacitor Cst. Accordingly, the gate-source voltage (e.g., Vgs) of the first transistor T1 may include the data voltage VDAT reflecting the threshold voltage of the first transistor T1. In other words, in the compensation period Pd3, the threshold voltage of the first transistor T1 may be detected, and the detected threshold voltage may be reflected in the data voltage VDAT, thereby compensating the data voltage VDAT.

Next, with reference to FIGS. 4 and 8, the operation of the display device 100 during the second bias period Pd4 of the display scan segment DSS will be described as follows.

Figure 8:
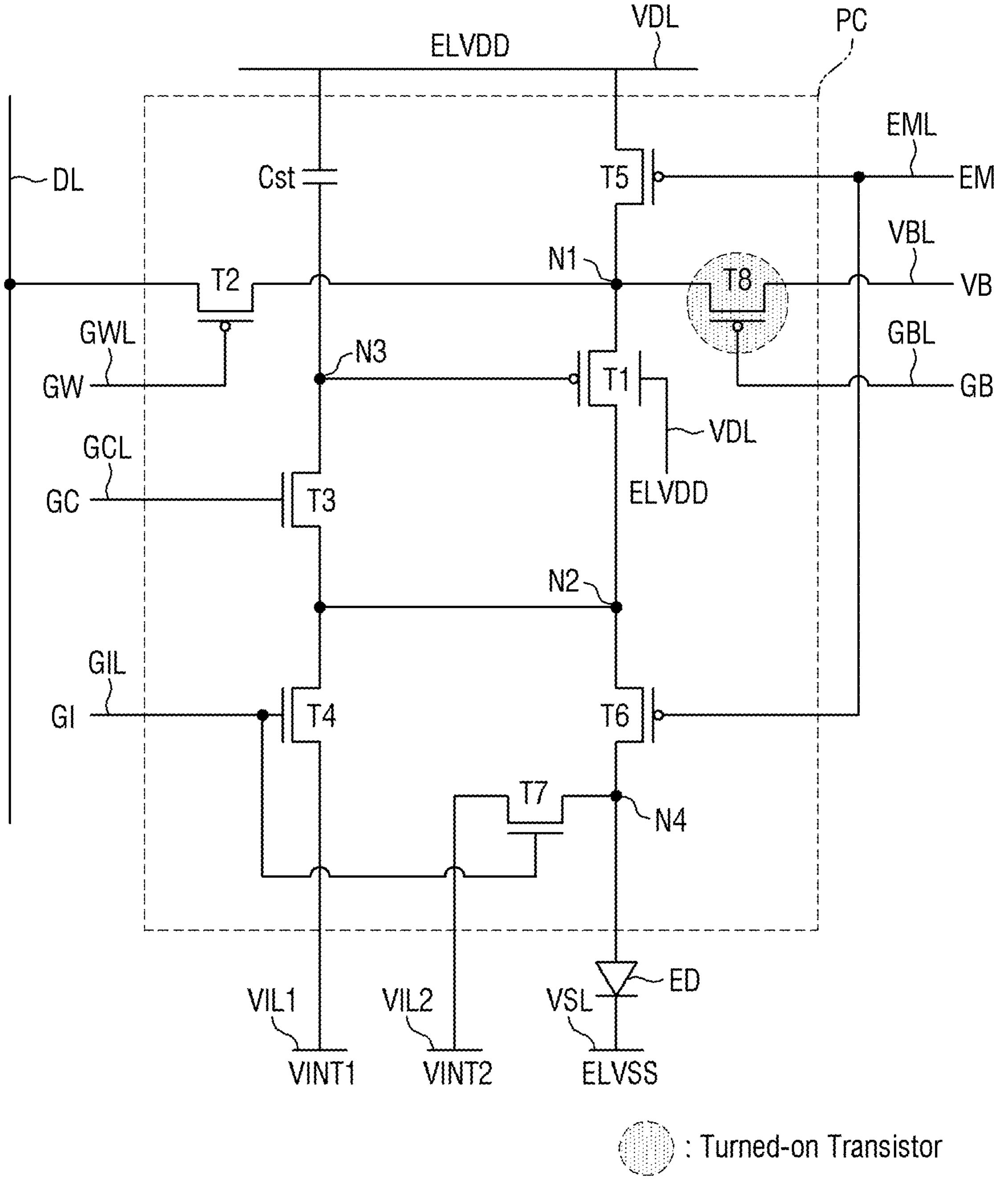
FIG. 8 is a diagram illustrating the operation of the display device of FIG. 3 during the second bias period of the display scan segment of FIG. 4.

FIG. 8 is a diagram illustrating the operation of the display device 100 of FIG. 3 during the second bias period Pd4 of the display scan segment DSS of FIG. 4.

As shown in FIG. 4, during the second bias period Pd4, the fourth gate signal GB may have the active level. Meanwhile, during the second bias period Pd4, the emission signal EM, the third gate signal GI, the second gate signal GC, and the first gate signal GW may each have the non-active level.

The active level fourth gate signal GB may be applied to the gate electrode of the eighth transistor T8 through the fourth gate line GBL. Accordingly, the eighth transistor T8 may be turned on.

The non-active level emission signal EM may be applied to each of the gate electrode of the fifth transistor T5 and the gate electrode of the sixth transistor T6 through the emission line EML. Accordingly, the fifth transistor T5 and the sixth transistor T6 may each be turned off.

The non-active level third gate signal GI may be applied to each of the gate electrode of the fourth transistor T4 and the gate electrode of the seventh transistor T7 through the third gate line GIL. Accordingly, the fourth transistor T4 and the seventh transistor T7 may each be turned off.

The non-active level second gate signal GC may be applied to the gate electrode of the third transistor T3 through the second gate line GCL. Accordingly, the third transistor T3 may be turned off.

The non-active level first gate signal GW may be applied to the gate electrode of the second transistor T2 through the first gate line GWL. Accordingly, the second transistor T2 may be turned off.

As the eighth transistor T8 is turned on, the bias voltage VB from the bias voltage line VBL may be applied to the first node N1 (e.g., the source electrode of the first transistor T1) through the turned-on eighth transistor T8. Accordingly, the hysteresis characteristics of the first transistor T1 may be stabilized.

Meanwhile, during the second bias period Pd4, the first transistor T1 may be maintained in a turn-off state.

Next, with reference to FIGS. 4 and 9, the operation of the display device 100 in the emission period Pd5 of the display scan segment DSS will be described as follows.

Figure 9:
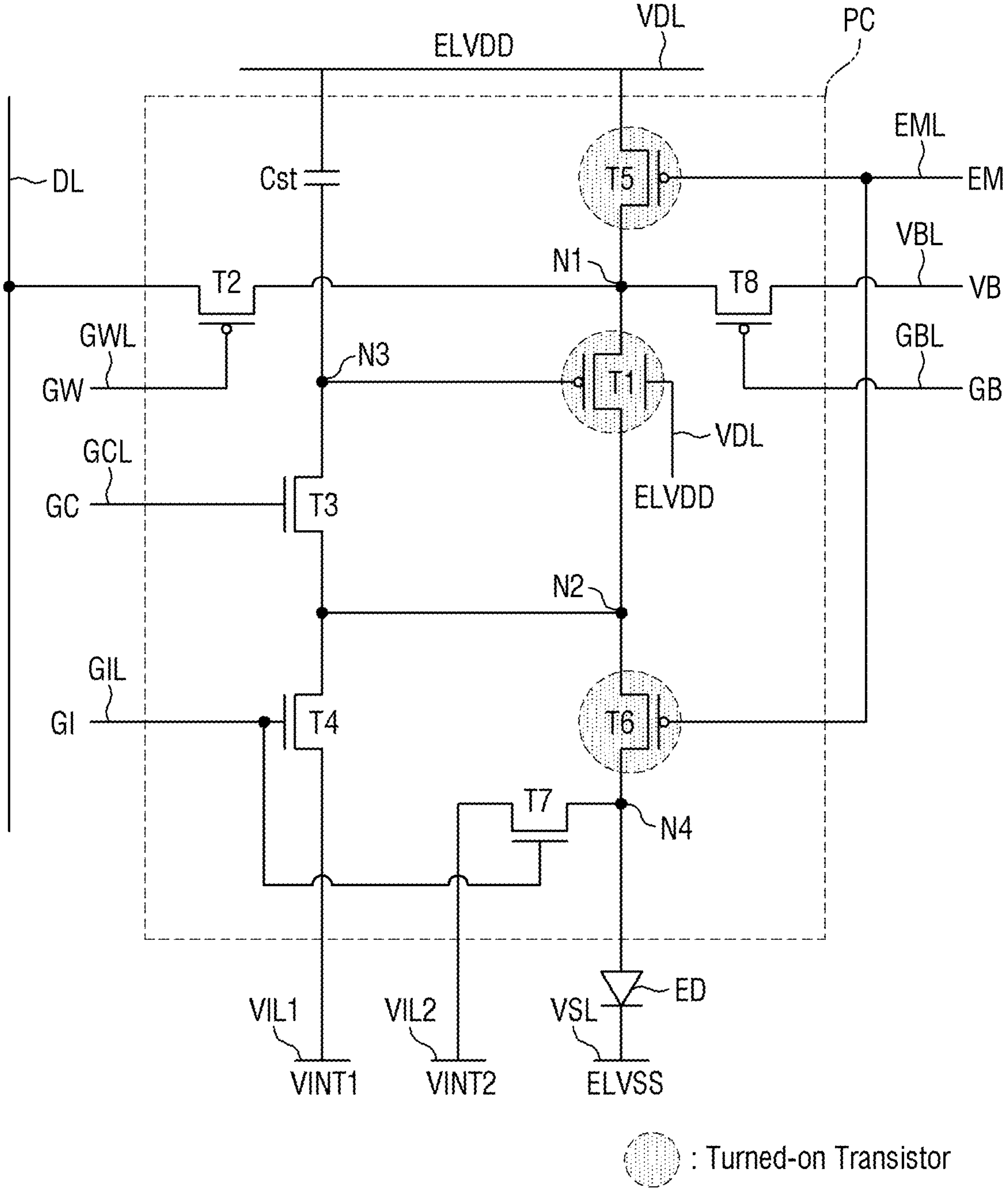
FIG. 9 is a diagram illustrating the operation of the display device of FIG. 3 during the emission period of the display scan segment of FIG. 4.

FIG. 9 is a diagram illustrating the operation of the display device 100 of FIG. 3 during the emission period Pd5 of the display scan segment DSS of FIG. 4.

As shown in FIG. 4, during the emission period Pd5, the emission signal EM may have the active level. Meanwhile, during the emission period Pd5, the third gate signal GI, the second gate signal GC, the first gate signal GW, and the fourth gate signal GB may each have the non-active level.

The active level emission signal EM may be applied to each of the gate electrode of the fifth transistor T5 and the gate electrode of the sixth transistor T6 through the emission line EML. Accordingly, the fifth transistor T5 and the sixth transistor T6 may each be turned on.

The non-active level third gate signal GI may be applied to each of the gate electrode of the fourth transistor T4 and the gate electrode of the seventh transistor T7 through the third gate line GIL. Accordingly, the fourth transistor T4 and the seventh transistor T7 may each be turned off.

The non-active level second gate signal GC may be applied to the gate electrode of the third transistor T3 through the second gate line GCL. Accordingly, the third transistor T3 may be turned off.

The non-active level first gate signal GW may be applied to the gate electrode of the second transistor T2 through the first gate line GWL. Accordingly, the second transistor T2 may be turned off.

The non-active level fourth gate signal GB may be applied to the gate electrode of the eighth transistor T8 through the fourth gate line GBL. Accordingly, the eighth transistor T8 may be turned off.

Meanwhile, in the emission period Pd5, the first transistor T1 may be maintained in a turn-on state by the gate-source voltage maintained by the capacitor Cst.

As the first transistor T1, the fifth transistor T5, and the sixth transistor T6 are turned on in the emission period Pd5, the driving voltage ELVDD may be applied to the first electrode (e.g., the fourth node N4) of the light-emitting element ED through the turned-on first transistor T1, fifth transistor T5, and sixth transistor T6. At this time, because the gate-source voltage maintained by the capacitor Cst includes the threshold voltage of the first transistor T1, the magnitude of the driving current flowing to the light-emitting element ED through the turned-on first transistor T1 may be determined based on the data voltage VDAT and the threshold voltage of the first transistor T1. Accordingly, the driving current supplied to the light-emitting element ED may accurately reflect the magnitude of the data voltage. In other words, the aforementioned driving current may have an accurate value in which the threshold voltage of the first transistor T1 is compensated. In this way, the threshold voltages having different values of the first transistors T1 of the respective pixels PX may be compensated to determine the driving current of each pixel PX, so that the luminance deviations between the pixels PX due to the deviations in the threshold voltages between the first transistors T1 of the respective pixels PX may be reduced or minimized. Accordingly, the image quality of the display device 100 may be improved.

Figure 10:
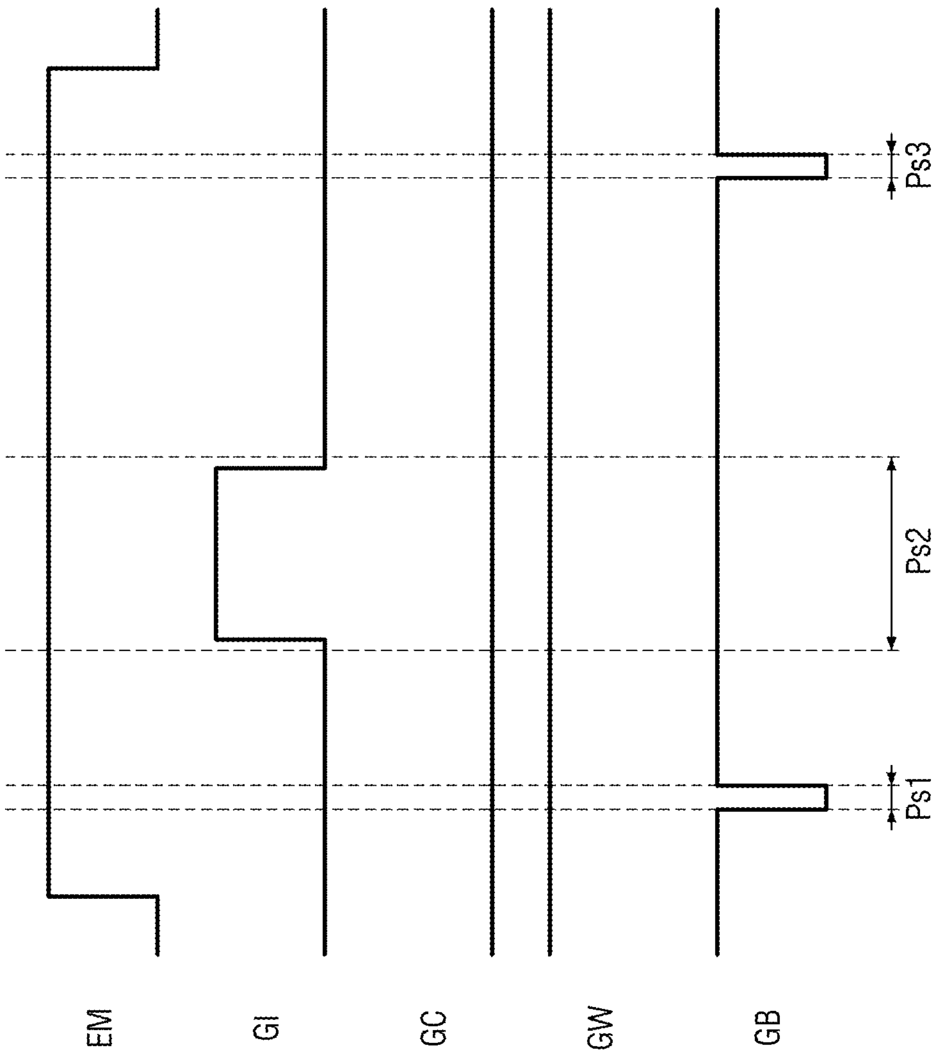
FIG. 10 is a timing diagram of the emission signal, the third gate signal, the second gate signal, the first gate signal, and the fourth gate signal of FIG. 3 in the self-scan segment.

FIG. 10 is a timing diagram of the emission signal EM, the third gate signal GI, the second gate signal GC, the first gate signal GW, and the fourth gate signal GB of FIG. 3 in the self-scan segment SFS.

Referring to FIG. 10, the self-scan segment SFS may include periods including a first bias period Ps1, an initialization period Ps2, and a second bias period Ps3.

The emission signal EM, the third gate signal GI, the second gate signal GC, the first gate signal GW, and the fourth gate signal GB may each have the active level or the non-active level for each period of the self-scan segment SFS. Here, the active level of each signal described above may mean a voltage at a level capable of turning on a corresponding transistor to which the corresponding signal is applied. In other words, the active level signal may have a value greater than the threshold voltage of the corresponding transistor. For example, when the corresponding transistor is a p-type transistor, the active level of the signal applied to the gate electrode of the corresponding transistor may mean a low level (e.g., negative polarity level or low voltage level).

Meanwhile, the non-active level of each signal may mean a voltage at a level capable of turning off a corresponding transistor. In other words, the non-active level signal may have a smaller value than the threshold voltage of the corresponding transistor. For example, when the corresponding transistor is a p-type transistor, the non-active level of the signal applied to the gate electrode of the corresponding transistor may mean a high level (e.g., positive polarity level or high voltage level).

In contrast, when the corresponding transistor is an n-type transistor, the active level of the signal applied to the gate electrode of the corresponding transistor may mean a high level (e.g., positive polarity level or high voltage level), and the non-active level of the signal applied to the gate electrode of the corresponding transistor may mean a low level (e.g., negative polarity level or low voltage level).

During the first bias period Ps1, the fourth gate signal GB may have the active level. Meanwhile, during the first bias period Ps1, the emission signal EM, the third gate signal GI, the second gate signal GC, and the first gate signal GW may each have the non-active level.

During the initialization period Ps2, the third gate signal GI may have the active level. Meanwhile, during the initialization period Ps2, the emission signal EM, the second gate signal GC, the first gate signal GW, and the fourth gate signal GB may each have the non-active level.

During the second bias period Ps3, the fourth gate signal GB may have the active level. Meanwhile, during the second bias period Ps3, the emission signal EM, the third gate signal GI, the second gate signal GC, and the first gate signal GW may each have the non-active level.

Figure 11:
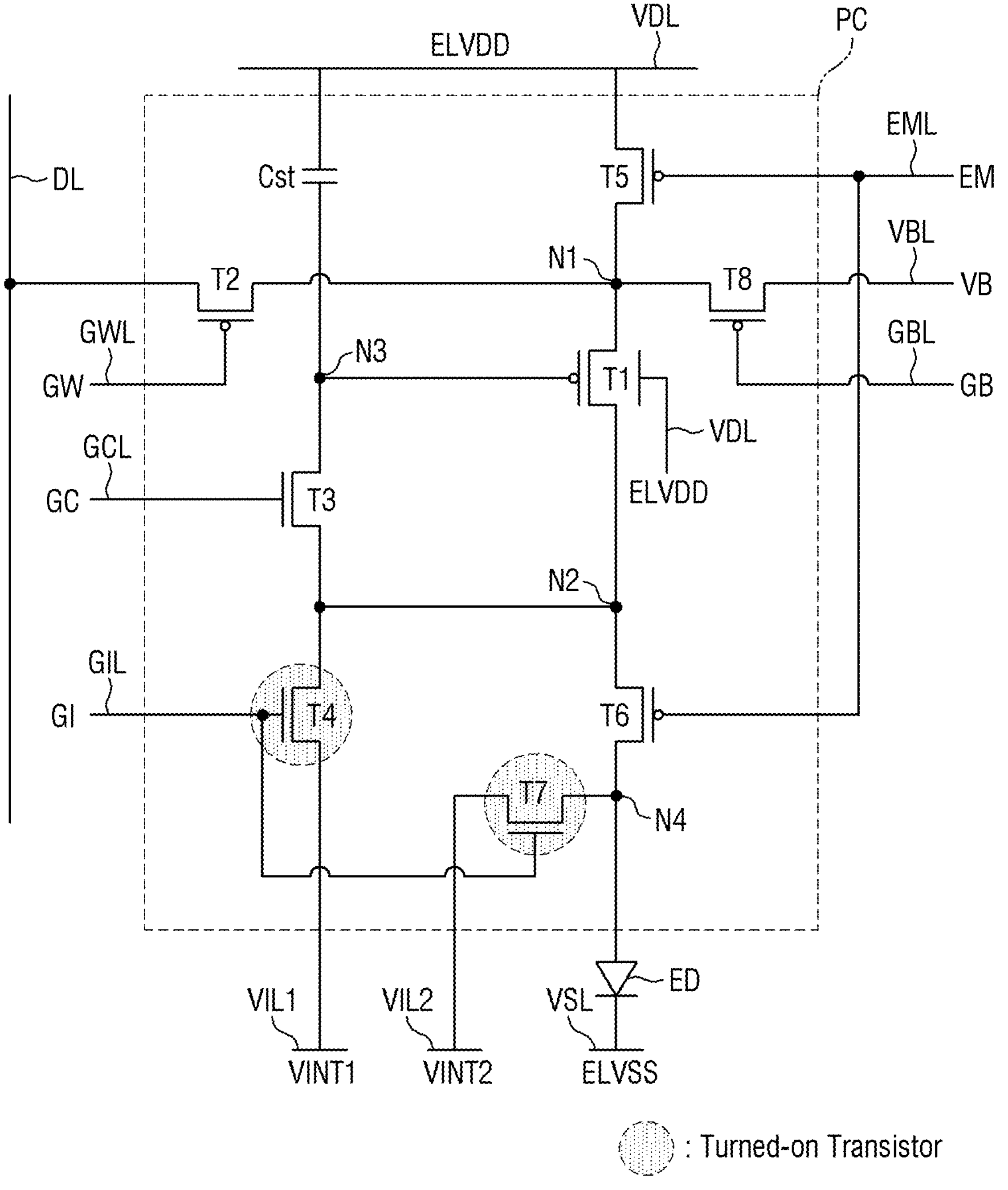
FIG. 11 is a diagram illustrating the operation of the display device of FIG. 3 during the initialization period of the self-scan segment of FIG. 10.

With reference to FIG. 11, the operation of the display device 100 in the self-scan segment SFS according to one or more embodiments will be described as follows. In FIG. 11, transistors surrounded by dotted circles are in a turn-on state, and transistors other than those surrounded by the dotted circles are in a turn-off state.

First, with reference to FIGS. 10 and 8, the operation of the display device 100 during the first bias period Ps1 of the self-scan segment SFS will be described as follows. The operation of the display device 100 during the first bias period Ps1 of the self-scan segment SFS is the same as the operation of the display device 100 during the second bias period Pd4 of the display scan segment DSS described above. Therefore, refer to FIG. 8 and the related description for the description of the operation of the display device 100 during the first bias period Ps1 of the self-scan segment SFS.

Next, with reference to FIGS. 10 and 11, the operation of the display device 100 during the initialization period Ps2 of the self-scan segment SFS will be described as follows.

FIG. 11 is a diagram illustrating the operation of the display device 100 of FIG. 3 during the initialization period Ps2 of the self-scan segment SFS of FIG. 10.

During the initialization period Ps2, the third gate signal GI may have the active level. Meanwhile, during the initialization period Ps2, the emission signal EM, the second gate signal GC, the first gate signal GW, and the fourth gate signal GB may each have the non-active level.

The active level third gate signal GI may be applied to each of the gate electrode of the fourth transistor T4 and the gate electrode of the seventh transistor T7 through the third gate line GIL. Accordingly, the fourth transistor T4 and the seventh transistor T7 may each be turned on.

The non-active level emission signal EM may be applied to each of the gate electrode of the fifth transistor T5 and the gate electrode of the sixth transistor T6 through the emission line EML. Accordingly, the fifth transistor T5 and the sixth transistor T6 may each be turned off.

The non-active level second gate signal GC may be applied to the gate electrode of the third transistor T3 through the second gate line GCL. Accordingly, the third transistor T3 may be turned off.

The non-active level first gate signal GW may be applied to the gate electrode of the second transistor T2 through the first gate line GWL. Accordingly, the second transistor T2 may be turned off.

The non-active level fourth gate signal GB may be applied to the gate electrode of the eighth transistor T8 through the fourth gate line GBL. Accordingly, the eighth transistor T8 may be turned off.

Meanwhile, during the initialization period Ps2, the first transistor T1 may be maintained in a turn-off state.

As the fourth transistor T4 is turned on, the voltage of the second node N2 may be initialized to the first initialization voltage VINT1. In other words, the voltage of the drain electrode of the first transistor T1 may be initialized to the first initialization voltage VINT1. In this way, as the voltage of the drain electrode of the first transistor T1 in the self-scan segment SFS is maintained at the first initialization voltage VINT1, which may be a known voltage rather than an unknown voltage, the occurrence of spots on the screen of the display device 100 may be reduced or prevented during the above-described emission period Pd5.

As the seventh transistor T7 is turned on, the voltage of the fourth node N4 may be initialized to the second initialization voltage VINT2. In other words, the voltage of the first electrode of the light-emitting element ED may be initialized to the second initialization voltage VINT2.

On the other hand, as the first transistor T1, the fifth transistor T5, and the sixth transistor T6 are each turned off, and as a reverse bias voltage is applied to the light-emitting element ED, the light-emitting element ED may be maintained in an unlit state during the initialization period Ps2.

Next, with reference to FIGS. 10 and 8, the operation of the display device 100 during the second bias period Ps3 of the self-scan segment SFS will be described as follows. The operation of the display device 100 during the second bias period Ps3 of the self-scan segment SFS is the same as the operation of the display device 100 during the second bias period Pd4 of the display scan segment DSS described above. Therefore, refer to FIG. 8 and the related description for the description of the operation of the display device 100 during the second bias period Ps3 of the self-scan segment SFS.

Meanwhile, the above-described light-emitting element ED may have a tandem structure, which will be described as follows with reference to FIGS. 12 to 19.

FIGS. 12 to 16 are cross-sectional views showing a structure of a light-emitting element according to one or more embodiments.

Figure 12:
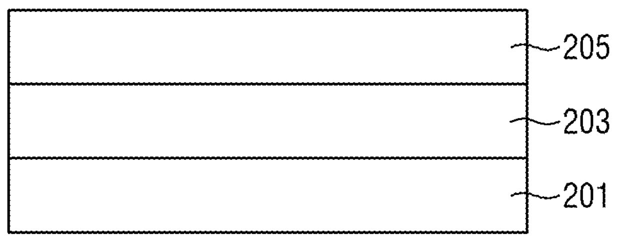
FIGS. 12 to 16 are cross-sectional views showing a structure of a light-emitting element according to one or more embodiments.

Referring to FIG. 12, a light-emitting element (e.g., an organic light-emitting diode) according to one or more embodiments may include a pixel electrode 201, a common electrode 205, and an intermediate layer 203 between the pixel electrode 201 and the common electrode 205.

The pixel electrode 201 may include a light-transmitting conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 201 may include a reflective layer containing silver (Ag), magnesium (Mg), aluminum (Al), platinum (Pt), palladium (Pd), gold (Au), nickel (Ni), neodymium (Nd), iridium (Ir), chromium (Cr), or a compound thereof. For example, the pixel electrode 201 may have a three-layer structure of ITO/Ag/ITO.

The common electrode 205 may be located on the intermediate layer 203. The common electrode 205 may include a low work function metal, an alloy, an electrically conductive compound, or any combination thereof. For example, the common electrode 205 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or any combination thereof. The common electrode 205 may be a transmissive electrode, a semi-transmissive electrode, or a reflective electrode.

The intermediate layer 203 may include a high molecular material or a low molecular material that emits light of a color (e.g., predetermined color). In addition to various organic materials, the intermediate layer 203 may further include metal-containing compounds, such as organometallic compounds, inorganic materials, such as quantum dots, and the like.

In one or more embodiments, the intermediate layer 203 may include one light-emitting layer, and may include a first functional layer and a second functional layer respectively located below and above the one light-emitting layer. The first functional layer may include, for example, a hole transport layer HTL or may include the hole transport layer and a hole injection layer HIL. The second functional layer may be a component located on the light-emitting layer and is optional. For example, the intermediate layer 203 may include or may not include the second functional layer. The second functional layer may include an electron transport layer ETL and/or an electron injection layer EIL.

In one or more embodiments, the intermediate layer 203 may include two or more emitting units that are sequentially stacked between the pixel electrode 201 and the common electrode 205, and a charge generation layer CGL located between the two emitting units. When the intermediate layer 203 includes an emitting unit and a charge generation layer, a light-emitting element (e.g., an organic light-emitting diode) may be a tandem light-emitting element. A light-emitting element (e.g., an organic light-emitting diode) may improve color purity and luminous efficiency by having a stacked structure of a plurality of emitting units.

One emitting unit may include a light-emitting layer, and may include a first functional layer and a second functional layer respectively located below and above the light-emitting layer. The charge generation layer CGL may include a negative charge generation layer and a positive charge generation layer. The luminous efficiency of an organic light-emitting diode, which is a tandem light-emitting element having a plurality of light-emitting layers, may be further increased by the negative charge generation layer and the positive charge generation layer.

The negative charge generation layer may be an n-type charge generation layer. The negative charge generation layer may supply electrons. The negative charge generation layer may include a host and a dopant. The host may include an organic material. The dopant may include a metal material. The positive charge generation layer may be a p-type charge generation layer. The positive charge generation layer may supply holes. The positive charge generation layer may include a host and a dopant. The host may include an organic material. The dopant may include a metal material.

Figure 13:
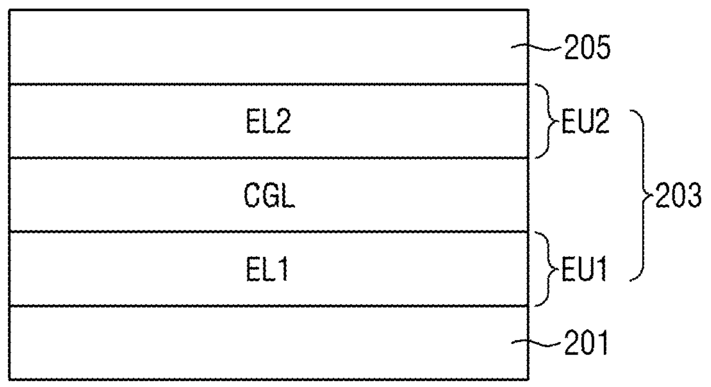

In one or more embodiments, as illustrated in FIG. 13, a light-emitting element (e.g., an organic light-emitting diode) may include a first emitting unit EU1 including a first light-emitting layer EL1, and a second emitting unit EU2 including a second light-emitting layer EL2, which are sequentially stacked. The charge generation layer CGL may be located between the first emitting unit EU1 and the second emitting unit EU2. For example, a light-emitting element (e.g., an organic light-emitting diode) may include the pixel electrode 201, the first light-emitting layer EL1, the charge generation layer CGL, the second light-emitting layer EL2, and the common electrode 205, which are sequentially stacked. The first functional layer and the second functional layer may be located on and under the first light-emitting layer EL1, respectively. The first functional layer and the second functional layer may be included below and above the second light-emitting layer EL2, respectively. The first light-emitting layer EL1 may be a blue light-emitting layer, and the second light-emitting layer EL2 may be a yellow light-emitting layer.

Figure 14:
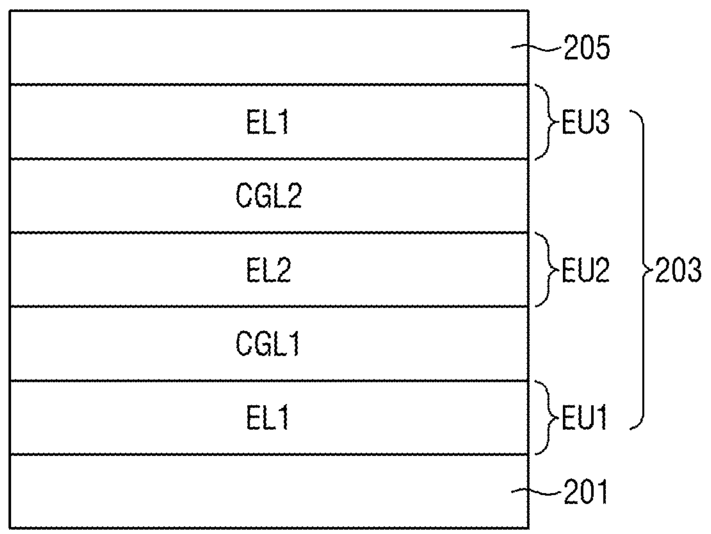

In one or more embodiments, as illustrated in FIG. 14, a light-emitting element (e.g., an organic light-emitting diode) may include the first emitting unit EU1 and a third emitting unit EU3 both including the first light-emitting layer EL1, and may include the second emitting unit EU2 including the second light-emitting layer EL2. A first charge generation layer CGL1 may be located between the first emitting unit EU1 and the second emitting unit EU2, and a second charge generation layer CGL2 may be located between the second emitting unit EU2 and the third emitting unit EU3. For example, a light-emitting element (e.g., an organic light-emitting diode) may include the pixel electrode 201, the first light-emitting layer EL1, the first charge generation layer CGL1, the second light-emitting layer EL2, the second charge generation layer CGL2, the first light-emitting layer EL1, and the common electrode 205, which are sequentially stacked. The first functional layer and the second functional layer may be located on and under the first light-emitting layer EL1, respectively. The first functional layer and the second functional layer may be located on and below the second light-emitting layer EL2, respectively. The first light-emitting layer EL1 may be a blue light-emitting layer, and the second light-emitting layer EL2 may be a yellow light-emitting layer.

In one or more embodiments (e.g., see FIGS. 15 and 16), in a light-emitting element (e.g., an organic light-emitting diode), the second emitting unit EU2 may further include a third light-emitting layer EL3 and/or a fourth light-emitting layer EL4 directly in contact with the second light-emitting layer EL2 below and/or above the second light-emitting layer EL2, in addition to the second light-emitting layer EL2. Here, direct contact may mean that no other layer is located between the second light-emitting layer EL2 and the third light-emitting layer EL3 and/or between the second light-emitting layer EL2 and the fourth light-emitting layer EL4. The third light-emitting layer EL3 may be a red light-emitting layer, and the fourth light-emitting layer EL4 may be a green light-emitting layer.

Figure 15:
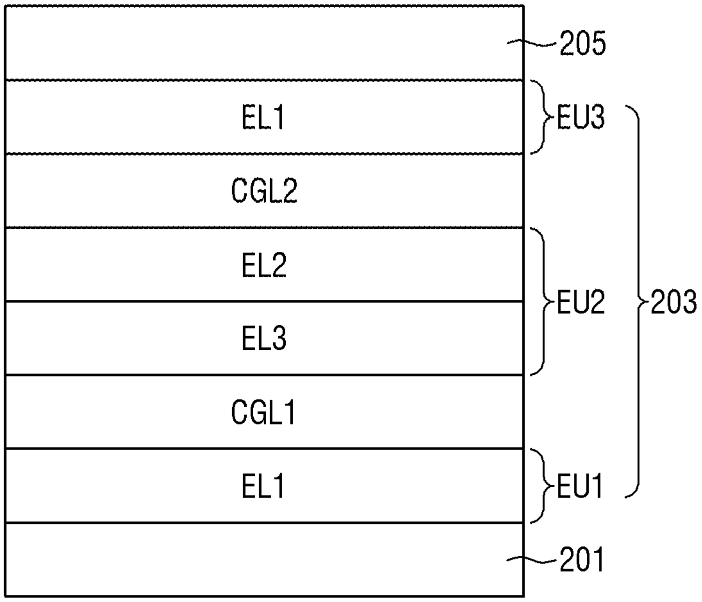

For example, as illustrated in FIG. 15, a light-emitting element (e.g., an organic light-emitting diode) may include the pixel electrode 201, the first light-emitting layer EL1, the first charge generation layer CGL1, the third light-emitting layer EL3, the second light-emitting layer EL2, the second charge generation layer CGL2, the first light-emitting layer EL1, and the common electrode 205, which are sequentially stacked. Alternatively, as illustrated in FIG. 16, a light-emitting element (e.g., an organic light-emitting diode) may include the pixel electrode 201, the first light-emitting layer EL1, the first charge generation layer CGL1, the third light-emitting layer EL3, the second light-emitting layer EL2, the fourth light-emitting layer EL4, the second charge generation layer CGL2, the first light-emitting layer EL1, and the common electrode 205, which are sequentially stacked.

Figure 16:
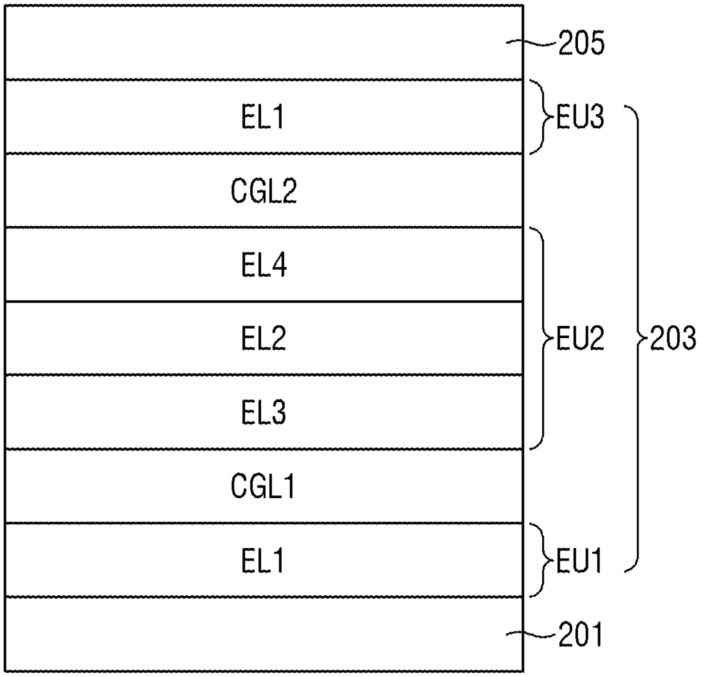
Figure 17:
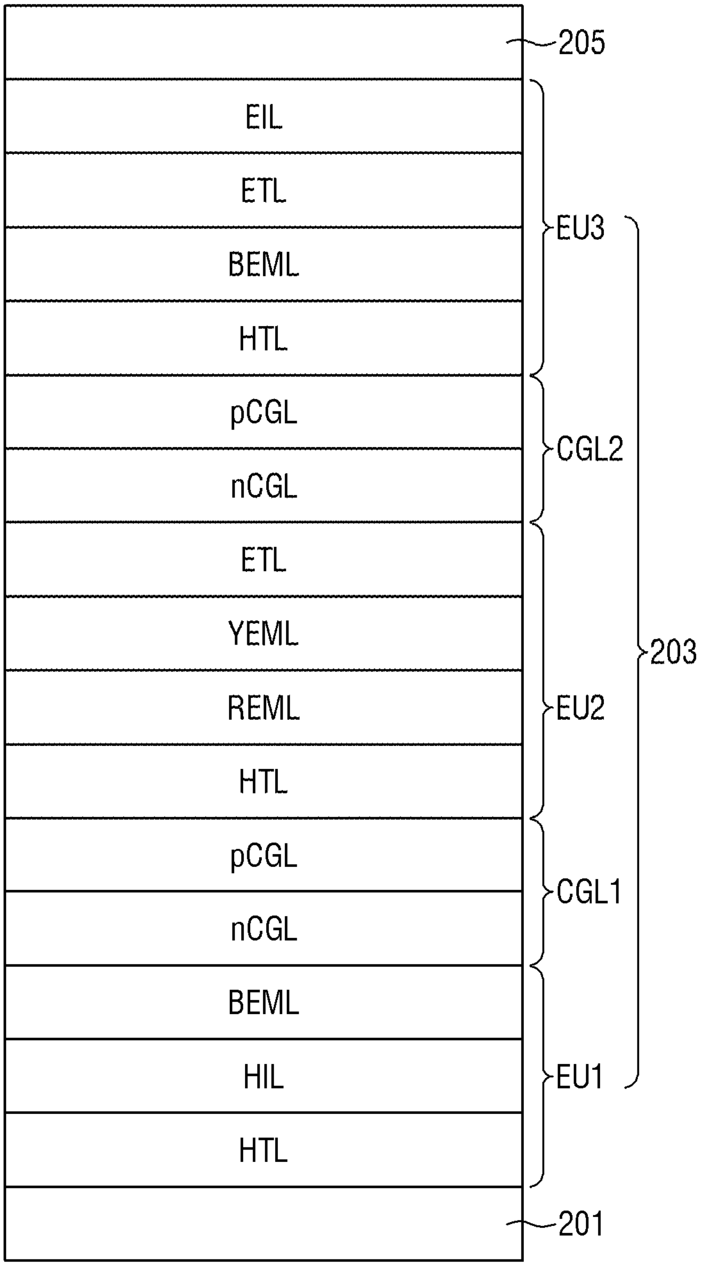
FIG. 17 is a cross-sectional view illustrating an example of the organic light-emitting diode of FIG. 15.
Figure 18:
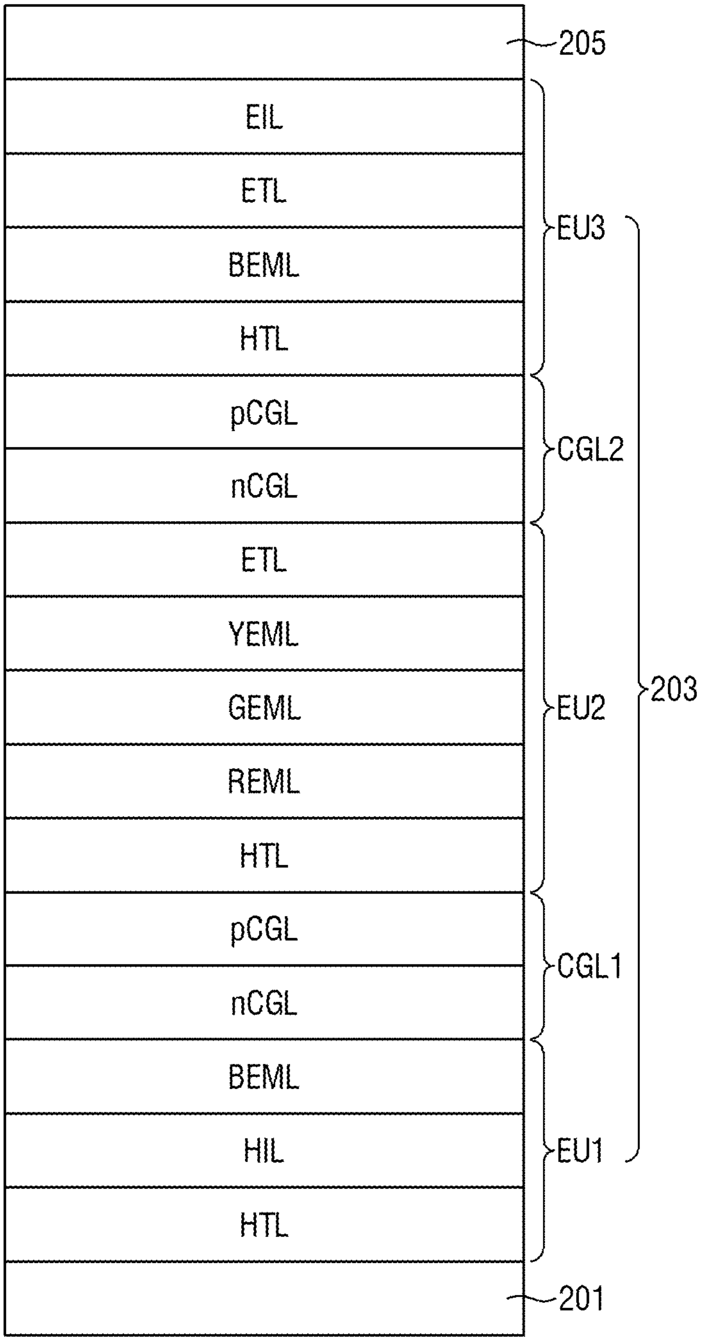
FIG. 18 is a cross-sectional view illustrating an example of the organic light-emitting diode of FIG. 16.

FIG. 17 is a cross-sectional view illustrating an example of the organic light-emitting diode of FIG. 15, and FIG. 18 is a cross-sectional view illustrating an example of the organic light-emitting diode of FIG. 16.

Referring to FIG. 17, a light-emitting element (e.g., an organic light-emitting diode) may include the first emitting unit EU1, the second emitting unit EU2, and the third emitting unit EU3 that are sequentially stacked. The first charge generation layer CGL1 may be located between the first emitting unit EU1 and the second emitting unit EU2, and the second charge generation layer CGL2 may be located between the second emitting unit EU2 and the third emitting unit EU3. The first charge generation layer CGL1 and the second charge generation layer CGL2 may include a negative charge generation layer nCGL and a positive charge generation layer pCGL, respectively.

The first emitting unit EU1 may include a blue light-emitting layer BEML. The first emitting unit EU1 may further include the hole injection layer HIL and the hole transport layer HTL between the pixel electrode 201 and the blue light-emitting layer BEML. In one or more embodiments, a p-doped layer may be further included between the hole injection layer HIL and the hole transport layer HTL. The P-doped layer may be formed by doping the hole injection layer HIL with a p-type doping material. In one or more embodiments, at least one of a blue light auxiliary layer, an electron-blocking layer, or a buffer layer may be further included between the blue light-emitting layer BEML and the hole transport layer HTL. The blue light auxiliary layer may increase light emission efficiency of the blue light-emitting layer BEML. The blue light auxiliary layer may increase light emission efficiency of the blue light-emitting layer BEML by adjusting hole charge balance. The electron-blocking layer may reduce or prevent electron injection into the hole transport layer HTL. The buffer layer may compensate for a resonance distance according to a wavelength of light emitted from the light-emitting layer.

The second emitting unit EU2 may include a yellow light-emitting layer YEML, and a red light-emitting layer REML below and in direct contact with the yellow light-emitting layer YEML. The second emitting unit EU2 may further include the hole transport layer HTL between the positive charge generation layer pCGL of the first charge generation layer CGL1 and the red light-emitting layer REML, and may further include the electron transport layer ETL between the yellow light-emitting layer YEML and the negative charge generation layer nCGL of the second charge generation layer CGL2.

The third emitting unit EU3 may include the blue light-emitting layer BEML. The third emitting unit EU3 may further include the hole transport layer HTL between the positive charge generation layer pCGL of the second charge generation layer CGL2 and the blue light-emitting layer BEML. The third emitting unit EU3 may further include the electron transport layer ETL and the electron injection layer EIL between the blue light-emitting layer BEML and the common electrode 205. The electron transport layer ETL may have a single layer or a multilayer. In one or more embodiments, at least one of a blue light auxiliary layer, an electron-blocking layer, or a buffer layer may be further included between the blue light-emitting layer BEML and the hole transport layer HTL. At least one of a hole-blocking layer or a buffer layer may be further included between the blue light-emitting layer BEML and the electron transport layer ETL. The hole-blocking layer may reduce or prevent holes being injected into the electron transport layer ETL.

A light-emitting element (e.g., an organic light-emitting diode) illustrated in FIG. 18 is different from the light-emitting element (e.g., an organic light-emitting diode) illustrated in FIG. 16 in the stacked structure of the second emitting unit EU2, and other configurations may be the same. Referring to FIG. 18, the second emitting unit EU2 may include the yellow light-emitting layer YEML, the red light-emitting layer REML below and directly in contact with the yellow light-emitting layer YEML, and a green light-emitting layer GEML above and directly in contact with the yellow light-emitting layer YEML. The second emitting unit EU2 may further include the hole transport layer HTL between the positive charge generation layer pCGL of the first charge generation layer CGL1 and the red light-emitting layer REML, and may further include the electron transport layer ETL between the green light-emitting layer GEML and the negative charge generation layer nCGL of the second charge generation layer CGL2.

Figure 19:
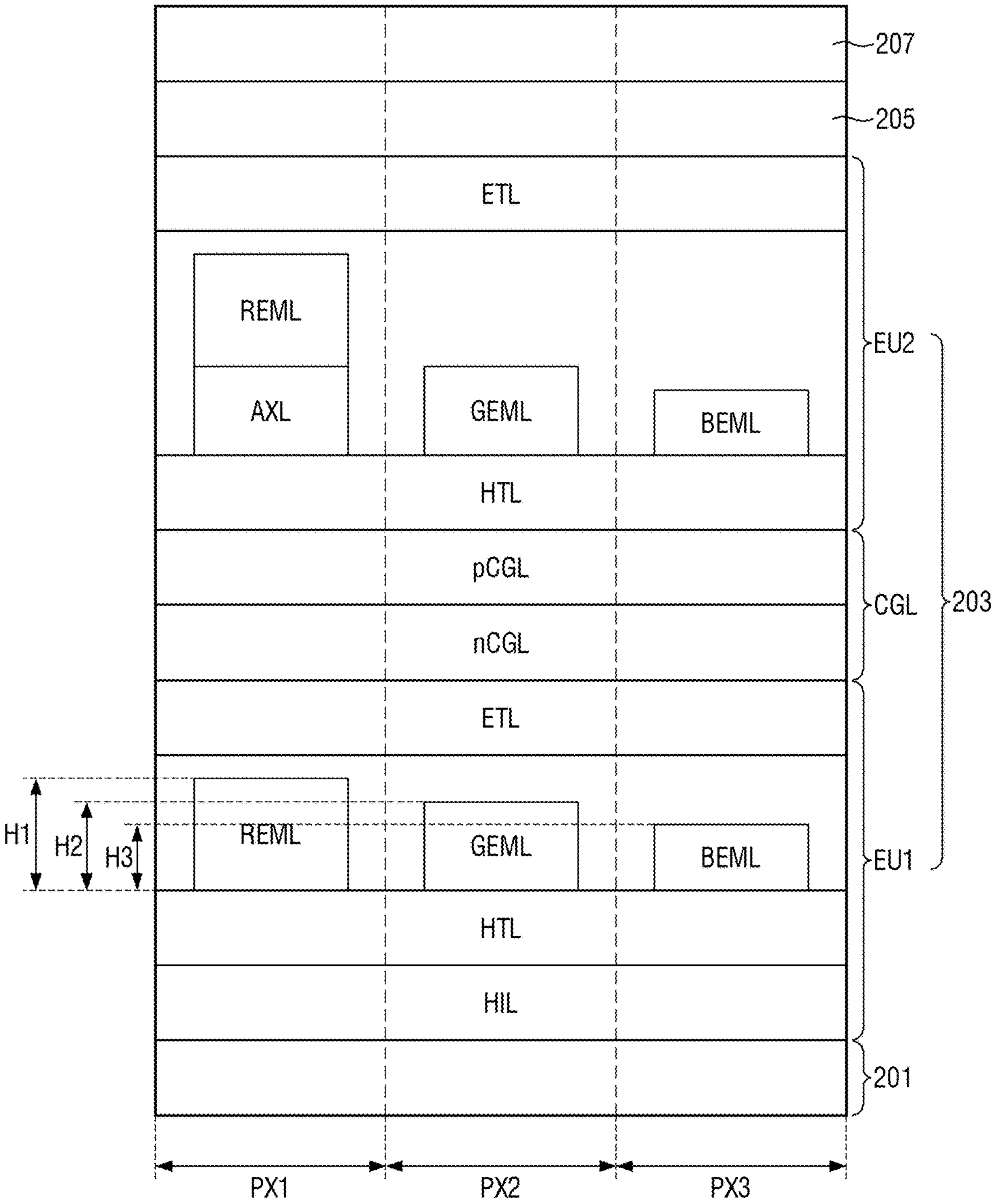
FIG. 19 is a cross-sectional view illustrating a structure of a pixel of a display device according to one or more embodiments.

FIG. 19 is a cross-sectional view illustrating a structure of a pixel of a display device according to one or more embodiments.

Referring to FIG. 19, the display panel 110 of the display device 100 may include a plurality of pixels. The plurality of pixels may include the first pixel PX1, the second pixel PX2, and the third pixel PX3. Each of the first pixel PX1, the second pixel PX2, and the third pixel PX3 may include the pixel electrode 201, the common electrode 205, and the intermediate layer 203. In one or more embodiments, the first pixel PX1 may be a red pixel, the second pixel PX2 may be a green pixel, and the third pixel PX3 may be a blue pixel.

The pixel electrode 201 may be independently provided in each of the first pixel PX1, the second pixel PX2, and the third pixel PX3.

The intermediate layer 203 of each of the first pixel PX1, the second pixel PX2, and the third pixel PX3 may include the first emitting unit EU1 and the second emitting unit EU2 that are sequentially stacked, and the charge generation layer CGL between the first emitting unit EU1 and the second emitting unit EU2. The charge generation layer CGL may include the negative charge generation layer nCGL and the positive charge generation layer pCGL. The charge generation layer CGL may be a common layer continuously formed in the first pixel PX1, the second pixel PX2, and the third pixel PX3.

The first emitting unit EU1 of the first pixel PX1 may include the hole injection layer HIL, the hole transport layer HTL, the red light-emitting layer REML, and the electron transport layer ETL that are sequentially stacked on the pixel electrode 201. The first emitting unit EU1 of the second pixel PX2 may include the hole injection layer HIL, the hole transport layer HTL, the green light-emitting layer GEML, and the electron transport layer ETL that are sequentially stacked on the pixel electrode 201. The first emitting unit EU1 of the third pixel PX3 may include the hole injection layer HIL, the hole transport layer HTL, the blue light-emitting layer BEML, and the electron transport layer ETL that are sequentially stacked on the pixel electrode 201. Each of the hole injection layer HIL, the hole transport layer HTL, and the electron transport layer ETL of the first emitting unit EU1 may be a common layer continuously formed in the first pixel PX1, the second pixel PX2, and the third pixel PX3.

The second emitting unit EU2 of the first pixel PX1 may include the hole transport layer HTL, an auxiliary layer AXL, the red light-emitting layer REML, and the electron transport layer ETL that are sequentially stacked on the charge generation layer CGL. The second emitting unit EU2 of the second pixel PX2 may include the hole transport layer HTL, the green light-emitting layer GEML, and the electron transport layer ETL that are sequentially stacked on the charge generation layer CGL. The second emitting unit EU2 of the third pixel PX3 may include the hole transport layer HTL, the blue light-emitting layer BEML, and the electron transport layer ETL that are sequentially stacked on the charge generation layer CGL. Each of the hole transport layer HTL and the electron transport layer ETL of the second emitting unit EU2 may be a common layer continuously formed in the first pixel PX1, the second pixel PX2, and the third pixel PX3. In one or more embodiments, at least one of a hole-blocking layer or a buffer layer may be further included between the light-emitting layer and the electron transport layer ETL in the second emitting unit EU2 of the first pixel PX1, the second pixel PX2, and the third pixel PX3.

A thickness H1 of the red light-emitting layer REML, a thickness H2 of the green light-emitting layer GEML, and a thickness H3 of the blue light-emitting layer BEML may be determined according to the resonance distance. The auxiliary layer AXL may be a layer added to adjust the resonance distance, and may include a resonance auxiliary material. For example, the auxiliary layer AXL may include the same material as the hole transport layer HTL.

In FIG. 19, the auxiliary layer AXL may be located only in the first pixel PX1, but the present disclosure is not limited thereto. For example, the auxiliary layer AXL may be located in at least one of the first pixel PX1, the second pixel PX2, or the third pixel PX3 to adjust the resonance distance of each of the first pixel PX1, the second pixel PX2, and the third pixel PX3.

The display panel 110 of the display device 100 may further include a capping layer 207 located outside the common electrode 205. The capping layer 207 may serve to improve luminous efficiency by the principle of constructive interference. Accordingly, the light extraction efficiency of a light-emitting element (e.g., an organic light-emitting diode) may be increased, so that the luminous efficiency of the light-emitting element (e.g., the organic light-emitting diode) may be improved.

The pixel of FIG. 3 described above may also be applied to the display device of FIGS. 20 and 21 to be described later.

Figure 20:
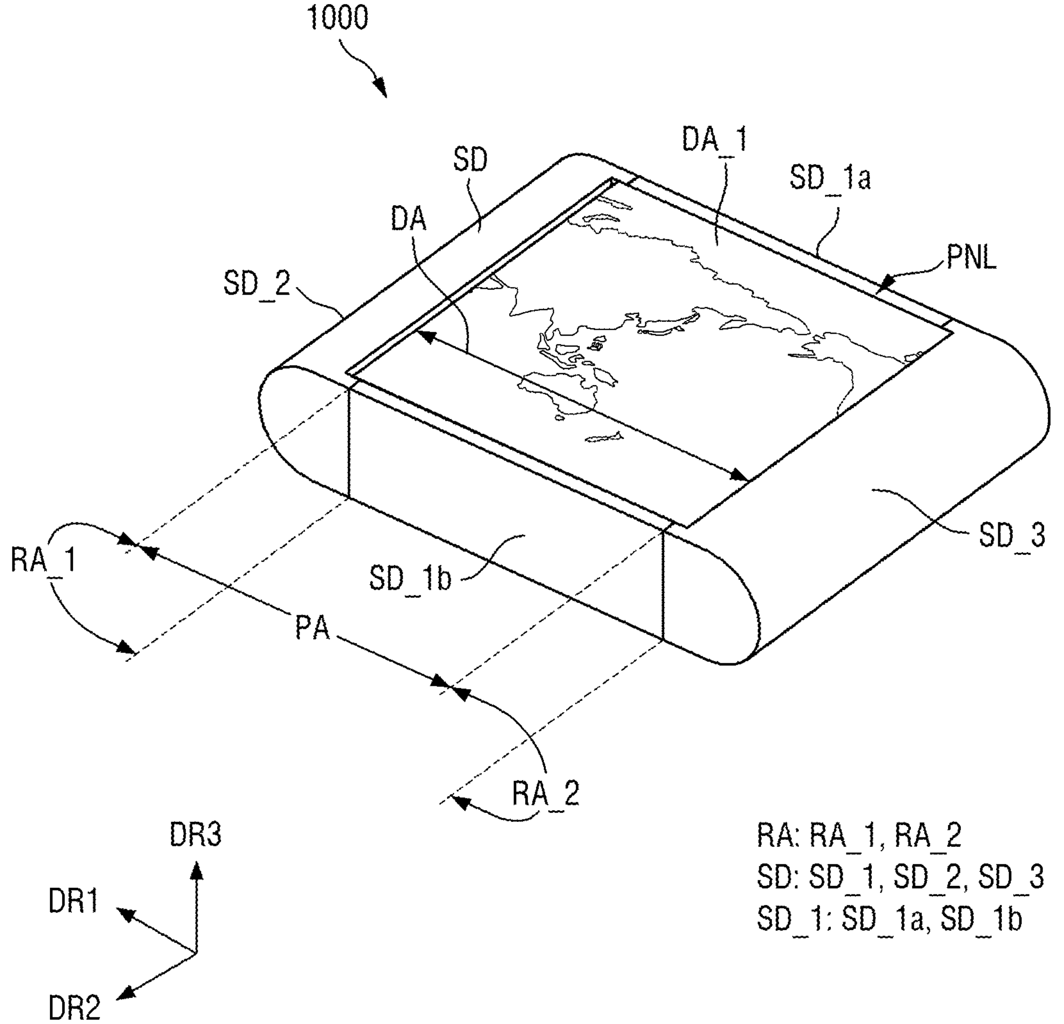
FIG. 20 is a perspective view illustrating a display device according to one or more embodiments.

FIG. 20 is a perspective view illustrating a display device according to one or more embodiments. FIG. 21 is a perspective view illustrating an extended state of a display device according to one or more embodiments.

In FIG. 20, the first direction DR1, the second direction DR2, and the third direction DR3 are defined. The first direction DR1 and the second direction DR2 may be perpendicular to each other, the first direction DR1 and the third direction DR3 may be perpendicular to each other, and the second direction DR2 and the third direction DR3 may be perpendicular to each other. It may be understood that the first direction DR1 refers to a horizontal direction in the drawing, the second direction DR2 refers to a vertical direction in the drawing, and the third direction DR3 refers to an upward and downward direction (e.g., a thickness direction) in the drawing. In the following specification, unless otherwise stated, "direction" may refer to both of directions extending along the direction. Further, when distinguishing both "directions" extending in both sides, one side will be referred to as "one side in the direction" and the other side will be referred to as "the other side in the direction." Referring to FIG. 20, a direction in which an arrow is directed is referred to as one side, and the opposite direction is referred to as the other side.

Hereinafter, for simplicity of description, when referring to a display device 1000 or the surfaces of each member constituting the display device 1000, one surface facing to one side in the direction in which the image is displayed, that is, the third direction DR3 is referred to as a top surface, and the opposite surface of the one surface is referred to as a bottom surface. However, the present disclosure is not limited thereto, and the one surface and the other surface of the member may be referred to as a front surface and a rear surface, respectively, or may also be referred to as a first surface or a second surface. Further, in describing the relative position of each member of the display device 1000, one side in the third direction DR3 may be referred to as an upper side and the other side in the third direction DR3 may be referred to as a lower side.

Figure 21:
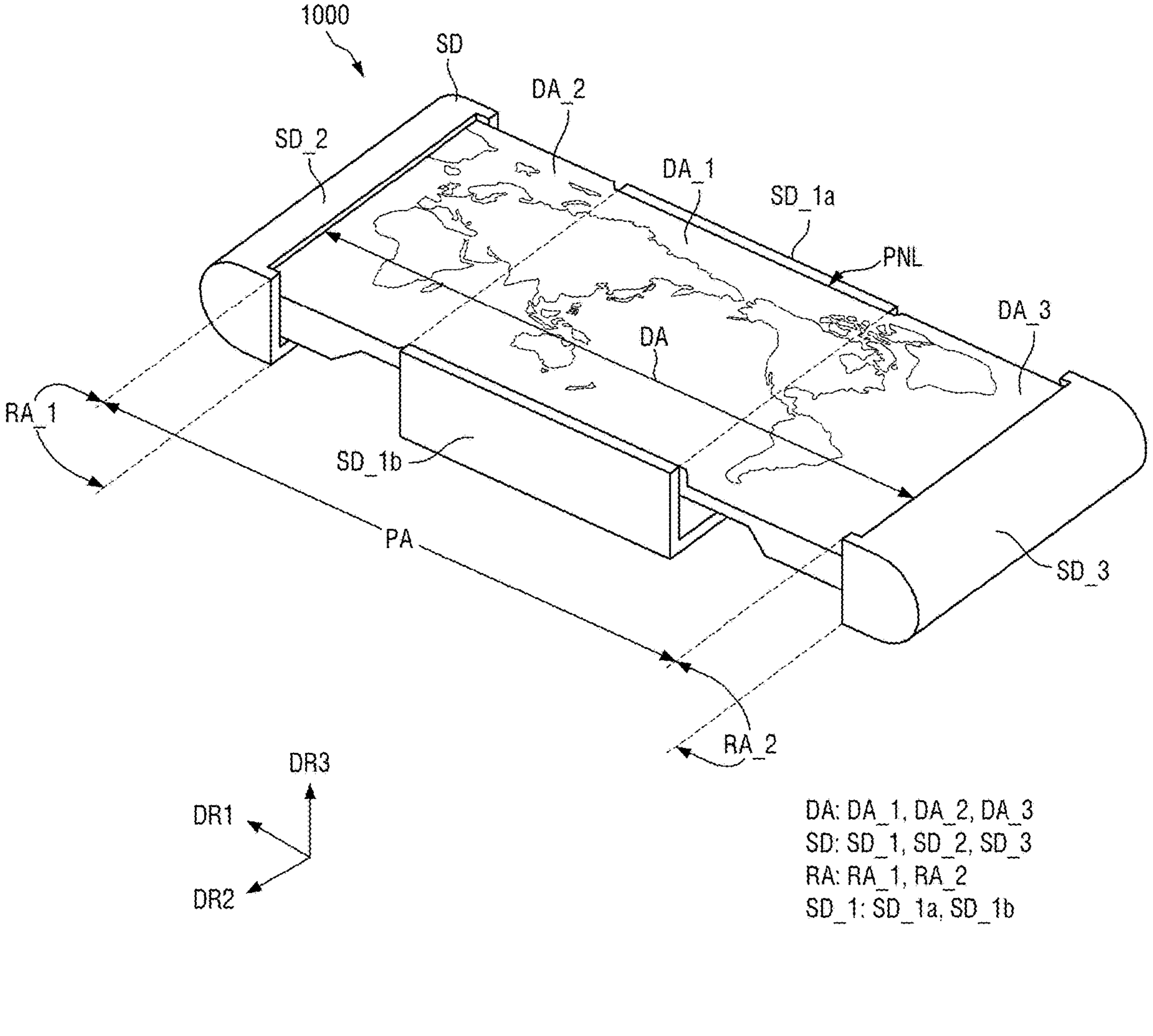
FIG. 21 is a perspective view illustrating an extended state of a display device according to one or more embodiments.

Referring to FIGS. 20 to 21, the display device 1000 according to one or more embodiments may be a sliding display device or a slidable display device that is slidable in the first direction DR1. The display device 1000 according to one or more embodiments may be a multi-slidable display device that slides in both directions (e.g., in both sides of the first direction DR1), but is not limited thereto. For example, the display device 1000 may be a single slidable display device that slides in only one direction (e.g., in only one side of the first direction DR1 or only the other side of the first direction DR1). Hereinafter, the display device 1000 according to one or more embodiments will be mainly described as a multi-slidable display device.

The display device 1000 may include a display device flat area PA and a display device bending area RA. The display device flat area PA of the display device 1000 substantially overlaps an area that exposes a display panel PNL of a panel storage container SD, which will be described later. The display device bending area RA of the display device 1000 may be formed in the panel storage container SD. The display device bending area RA may be bent with a radius of curvature (e.g., predetermined radius of curvature), and may be an area in which the display panel PNL is bent according to the radius of curvature. The display device bending areas RA may be located on both sides of the display device flat area PA in the first direction DR1. That is, a first display device bending area RA_1 may be located on one side of the display device flat area PA in the first direction DR1, and a second display device bending area RA_2 may be located on the other side of the display device flat area PA in the first direction DR1. Meanwhile, as illustrated in FIG. 21, the size of the display device flat area PA may increase as the display device 1000 expands. Accordingly, the distance between the first display device bending area RA_1 and the second display device bending area RA_2 may increase.

Referring to FIGS. 20 and 21, the display device 1000 according to one or more embodiments may include the display panel PNL and the panel storage container SD.

The display panel PNL is a panel for displaying a screen, and any type of display panel, such as an organic light-emitting display panel including an organic light-emitting layer, a micro light-emitting diode display panel using a micro light-emitting diode (LED), a quantum dot light-emitting display panel using a quantum dot light-emitting diode including a quantum dot light-emitting layer, or an inorganic light-emitting display panel using an inorganic light-emitting element including an inorganic semiconductor may be applied to the display panel PNL.

The display panel PNL may be a flexible panel. The display panel PNL may have flexibility to be partially rolled, bent, or curved in the panel storage container SD, as will be described later. The display panel PNL may be slid in the first direction DR1.

The display panel PNL may include an active region and a non-active region. The active region of the display panel PNL may be an area where the plurality of pixels are located. The non-active region of the display panel PNL may be an area in which no pixel is located. Metal lines, such as data/scan lines, touch lines, or power voltage lines may be located in the non-active region. The non-active region may be located to surround the active region.

The display area DA of the display panel PNL may be an area in which a screen is displayed. The display area DA may be divided into a first display area DA_1, a second display area DA_2, and a third display area DA_3 according to whether the display panel PNL slides or the sliding degree of the display panel PNL. The presence and size of the second display area DA_2 and the third display area DA_3 may vary according to whether the display panel PNL slides or the sliding degree of the display panel PNL. For example, in a non-sliding state, the display panel PNL has the first display area DA_1 having a first size. In a sliding state, the display area DA further includes the second display area DA_2 and the third display area DA_3 expanded in addition to the first display area DA_1.

The sizes of the second display area DA_2 and the third display area DA_3 may vary according to the degree of sliding. For example, in a state in which the display device 1000 is slid to the maximum, the second display area DA_2 may have a second size, the third display area DA_3 may have a third size, and the display area DA may have a fourth size that is the sum of the first area, the second area, and the third area. In this case, the fourth area may be a maximum area that the display area DA may have.

As shown in FIGS. 20 and 21, the panel storage container SD may serve to accommodate at least a part of the display panel PNL, and may assist the sliding operation of the display device 1000. The panel storage container SD may include a first storage container SD_1 located at the center of the display device 1000, a second storage container SD_2 that is located at one side of the first storage container SD_1 in the first direction DR1 and has the first display device bending area RA_1, and a third storage container SD_3 that is located at the other side of the first storage container SD_1 in the first direction DR1 and has a second display device bending area RA_2.

The first storage container SD_1 may connect the second storage container SD_2 and the third storage container SD_3 to each other. For example, the first storage container SD_1 may include a first_first storage container SD_1*a*, which connects the other side of the second storage container SD_2 in the second direction DR2 and the other side of the third storage container SD_3 in the second direction DR2, and a first_second storage container SD_1*b*, which connects one side of the second storage container SD_2 in the second direction DR2 and one side of the third storage container SD_3 in the second direction DR2.

In some embodiments, rails may be formed in the second storage container SD_2 and the third storage container SD_3 to guide the sliding operation of the display panel PNL, but the present disclosure is not limited thereto.

In concluding the detailed description, those skilled in the art will appreciate that many variations and modifications can be made to the embodiments without substantially departing from the aspects of the present disclosure. Therefore, the disclosed embodiments are used in a generic and descriptive sense only and not for purposes of limitation.

What is claimed is:

1. A display device comprising:

a light-emitting element connected between a driving voltage line and a common voltage line;

a first transistor connected between the driving voltage line and the light-emitting element;

a second transistor connected between a data line and a source electrode of the first transistor;

a third transistor connected between a gate electrode of the first transistor and a drain electrode of the first transistor; and a fourth transistor connected between a drain electrode of the first transistor and a first initialization voltage line, wherein the third transistor and the fourth transistor comprise a same type, and wherein, during an initialization period of a self-scan segment, a third gate signal delivered to a third gate line coupled to a gate electrode of the fourth transistor is configured to have an active level for a duration, and a second gate signal delivered to a second gate line coupled to a gate electrode of the third transistor is configured to have a non-active level during an entirety of the duration that the third gate signal has the active level.

2. The display device of claim 1, wherein the third transistor and the fourth transistor comprise an n-type transistor.

3. The display device of claim 1, further comprising a seventh transistor connected between a first electrode of the light-emitting element and a second initialization voltage line.

4. The display device of claim 3, wherein the third gate line is connected to a gate electrode of the seventh transistor.

5. The display device of claim 3, wherein the third transistor, the fourth transistor, and the seventh transistor comprise a same type.

6. The display device of claim 5, wherein the third transistor, the fourth transistor, and the seventh transistor comprise an n-type transistor.

7. The display device of claim 3, further comprising:

a fifth transistor connected between the source electrode of the first transistor and the driving voltage line;

a sixth transistor connected between the drain electrode of the first transistor and the first electrode of the light-emitting element;

an eighth transistor connected between the source electrode of the first transistor and a bias voltage line; and a capacitor connected between the driving voltage line and the gate electrode of the first transistor.

8. The display device of claim 7, further comprising:

a first gate line connected to a gate electrode of the second transistor;

an emission line connected to a gate electrode of the fifth transistor and to a gate electrode of the sixth transistor; and a fourth gate line connected to a gate electrode of the eighth transistor, wherein the third gate line is connected to a gate electrode of the seventh transistor.

9. The display device of claim 8, wherein the first gate line is configured to transmit a first gate signal, wherein the second gate line is configured to transmit the second gate signal, wherein the third gate line is configured to transmit the third gate signal, wherein the fourth gate line is configured to transmit a fourth gate signal, and wherein the emission line is configured to transmit an emission signal.

10. The display device of claim 9, wherein the first gate signal, the second gate signal, the third gate signal, the fourth gate signal, and the emission signal have the active level and the non-active level in a display scan segment and the self-scan segment.

11. The display device of claim 10, wherein the display scan segment comprises a first bias period, the initialization period, a compensation period, a second bias period, and an emission period.

12. The display device of claim 11, wherein, during the first bias period of the display scan segment, the second gate signal and the fourth gate signal are configured to have the active level, and the emission signal, the third gate signal, and the first gate signal are configured to have the non-active level.

13. The display device of claim 11, wherein, during the initialization period of the display scan segment, the third gate signal and the second gate signal are configured to have the active level, and the emission signal, the first gate signal, and the fourth gate signal are configured to have the non-active level.

14. The display device of claim 11, wherein, during the compensation period of the display scan segment, the second gate signal and the first gate signal are configured to have the active level, and the emission signal, the third gate signal, and the fourth gate signal are configured to have the non-active level.

15. The display device of claim 14, wherein the first gate signal is configured to have the active level during a data writing period of the compensation period.

16. The display device of claim 15, wherein a data voltage is configured to be applied to the data line during the data writing period.

17. The display device of claim 11, wherein, during the emission period, the emission signal is configured to have the active level, and the third gate signal, the second gate signal, the first gate signal, and the fourth gate signal are configured to have the non-active level.

18. The display device of claim 10, wherein the self-scan segment comprises a first bias period, the initialization period, and a second bias period.

19. The display device of claim 18, wherein, during the first bias period of the self-scan segment, the fourth gate signal is configured to have the active level, and the emission signal, the third gate signal, the second gate signal, and the first gate signal are configured to have the non-active level.

20. The display device of claim 18, wherein, during the initialization period of the self-scan segment, the third gate signal is configured to have the active level, and the emission signal, the second gate signal, the first gate signal, and the fourth gate signal are configured to have the non-active level.

21. The display device of claim 18, wherein, during the second bias period of the self-scan segment, the fourth gate signal is configured to have the active level, and the emission signal, the third gate signal, the second gate signal, and the first gate signal are configured to have the non-active level.

22. The display device of claim 7, wherein the first transistor, the second transistor, the fifth transistor, the sixth transistor, and the eighth transistor comprise a p-type transistor, and wherein the third transistor, the fourth transistor, and the seventh transistor comprise an n-type transistor.

23. A display device comprising:

a light-emitting element connected between a driving voltage line and a common voltage line;

a first transistor connected between the driving voltage line and the light-emitting element;

a second transistor connected between a data line and a source electrode of the first transistor;

a third transistor connected between a gate electrode of the first transistor and a drain electrode of the first transistor;

a fourth transistor connected between a drain electrode of the first transistor and a first initialization voltage line; and a seventh transistor connected between a first electrode of the light-emitting element and a second initialization voltage line, wherein the third transistor and the seventh transistor comprise a same type, and wherein, during an initialization period of a self-scan segment, a third gate signal delivered to a third gate line coupled to a gate electrode of the fourth transistor is configured to have an active level for a duration, and a second gate signal delivered to a second gate line coupled to a gate electrode of the third transistor is configured to have a non-active level during an entirety of the duration that the third gate signal has the active level.

24. The display device of claim 23, wherein the third transistor and the seventh transistor comprise an n-type transistor.

25. The display device of claim 23, wherein the third transistor, the fourth transistor, and the seventh transistor comprise a same type.

26. The display device of claim 25, wherein the third transistor, the fourth transistor, and the seventh transistor comprise an n-type transistor.

* * * * *